US006426567B2

(12) United States Patent
Ugusa et al.

(10) Patent No.: US 6,426,567 B2
(45) **Date of Patent: *Jul. 30, 2002**

(54) CRASH DETECTION APPARATUS OF VEHICLE RESPONSIVE TO ASYMMETRIC COLLISION

(75) Inventors: Aki Ugusa; Toshiyuki Yamashita, both of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 09/369,828

(22) Filed: Aug. 9, 1999

(30) Foreign Application Priority Data

Mar. 2, 1999 (JP) .......................................... 11-054797

(51) Int. Cl.[7] ............................................ G09G 17/00
(52) U.S. Cl. ......................... 307/10.1; 280/735; 701/45
(58) Field of Search ............................... 307/10.1, 121; 280/735; 701/45, 46, 47

(56) References Cited

U.S. PATENT DOCUMENTS 5,157,268 A * 10/1992 Spies et al. ................. 280/735
5,202,831 A * 4/1993 Blackburn et al. ......... 307/10.1
5,396,424 A * 3/1995 Moriyama et al. ......... 307/10.1
5,483,451 A * 1/1996 Ohmae et al. ............. 307/10.1
5,484,166 A * 1/1996 Mazur et al. .............. 307/10.1
5,555,174 A * 9/1996 Okimata et al. ........... 307/10.1
5,608,628 A * 3/1997 Drexler et al. ............. 307/10.1
5,609,358 A * 3/1997 Iyoda et al. ................ 180/274
5,732,374 A * 3/1998 Ohm ........................... 701/45
5,746,444 A * 5/1998 Foo et al. .................. 280/735
5,892,435 A * 4/1999 Buchheim et al. .......... 280/735
5,900,807 A * 5/1999 Moriyama et al. ......... 307/10.1
5,967,548 A * 10/1999 Kozyreff ..................... 280/735
5,995,892 A * 11/1999 Kiribayashi et al. .......... 701/45
6,005,479 A * 12/1999 Ide ............................ 307/10.1
6,036,225 A * 4/2000 Foo et al. .................. 280/735
6,104,973 A * 8/2000 Sugiyama et al. ............ 701/46
6,115,659 A * 9/2000 Buchheim et al. .......... 180/282
6,157,880 A * 12/2000 de Mersseman et al. 280/728.3
6,167,335 A * 12/2000 Ide ............................. 701/45
6,181,998 B1 * 1/2001 Kanameda et al. ......... 180/271
6,198,387 B1 * 3/2001 Dalum et al. ............... 180/282
6,227,563 B1 * 5/2001 Talisman .................... 280/735
6,249,730 B1 * 6/2001 Khairallah et al. ........... 701/45
6,278,923 B1 * 8/2001 Kanameda .................. 180/282

* cited by examiner

*Primary Examiner*—Josie Ballato
*Assistant Examiner*—Rios Roberto
(74) *Attorney, Agent, or Firm*—Sughrue Mion, PLLC

(57) ABSTRACT

A crash detection apparatus of a vehicle includes acceleration sensors mounted on different positions of a vehicle, each for detecting an acceleration at its position. A crash mode identifying section identifies a crash mode of the vehicle in accordance with a time difference between timings at which integral values obtained by integrating the individual acceleration signals supplied from the acceleration detectors exceed a threshold value. In accordance with the crash mode, a reference threshold value of a comparator for making a crash decision is determined. This makes it possible to implement a crash detection apparatus of a vehicle capable of making a responsive crash decision even in an asymmetric crash in which only one side of the vehicle is deformed and the occurrence of a large acceleration signal is delayed.

8 Claims, 21 Drawing Sheets

AIR BAG
AIR BAG ECU
INTEGRATOR
INTERNAL ACCELERATION SENSOR
Vth
DETECTOR (Tdiff)
Th
CRASH MODE IDENTIFYING SECTION
LEFT-FRONT ECU
LEFT-FRONT ACCELERATION SENSOR
INTEGRATOR
Vthl
ON-TIMER
RIGHT-FRONT ECU
RIGHT-FRONT ACCELERATION SENSOR
INTEGRATOR
Vthr
ON-TIMER

FRONTAL CRASH

OFFSET CRASH

OBLIQUE CRASH

REAR CRASH

INTEGRATOR 16
INTEGRATOR 20
vthr, vthl
TIME
Ttimer
Ttimer
Tdiff > Tth
OFFSET (OR OBLIQUE) CRASH
Vtha
Vthb
Vth
(a) OUTPUTS OF INTEGRATORS 16 AND 20
(b) OUTPUT OF ON-TIMER 22
OUTPUT OF ON-TIMER 18
(c) OUTPUT OF COMPARATOR 24
(d) OUTPUT OF INTEGRATOR 11
(e) OUTPUT OF COMPARATOR 12 (DEPLOY AIR BAG)
ON
OFF
ON
OFF
ON
OFF
DEPLOY
NOT DEPLOY AIR BAG
2
13
14
AIR BAG ECU
3
12
Vth
INTEGRATOR
11
INTERNAL ACCELERATION SENSOR
10
24
Tth
DETECTOR (Tdiff)
23
CRASH MODE IDENTIFYING SECTION
25
18
ON-TIMER
17
Vthl
16
INTEGRATOR
31
LEFT-FRONT ACCELERATION SENSOR
15
LEFT-FRONT ECU
5
22
ON-TIMER
21
Vthr
20
INTEGRATOR
32
RIGHT-FRONT ACCELERATION SENSOR
19
RIGHT-FRONT ECU
6

FRONT ECU
8
35
FRONT ACCELERATION SENSOR
41
36
INTEGRATOR
37
Vthf
38
ON-TIMER
39
DELAY CIRCUIT
AIR BAG ECU
3
10
INTERNAL ACCELERATION SENSOR
40
42
11
INTEGRATOR
12
Vth
14
13
2
AIR BAG

CRASH DETECTION APPARATUS OF VEHICLE RESPONSIVE TO ASYMMETRIC COLLISION

BACKGROUND OF THE INVENTION

1. Field of the Invention

The present invention relates to a crash detection apparatus of a vehicle for detecting a collision of a vehicle and for activating a passenger protective device for protecting its occupants.

2. Description of Related Art

FIG. 23, a schematic diagram showing a conventional crash detection apparatus of a vehicle disclosed, for example, in Japanese patent application laid-open No.3-208748/1991, illustrates a crash detection apparatus of a vehicle for activating a passenger protective device such as an air bag for protecting passengers (including the driver) in a vehicle. In FIG. 23, the reference numeral 1 designates a vehicle; 2 designates an air bag for protecting the passengers by deploying automatically in the event of collision of the vehicle 1; 3 designates an air bag ECU (Electric Control Unit) for controlling the deployment of the air bag 2 using an embedded acceleration sensor; and 4 designates a bumper switch that is mounted on a front bumper of the vehicle 1 and turns on in the event of collision of the vehicle 1.

Next, the operation of the conventional crash detection apparatus of the vehicle will be described.

In the event of collision of the vehicle 1 in traveling, the bumper switch 4 mounted on the front bumper of the vehicle 1 is turned on, and a collision signal is supplied from the bumper switch 4 to the air bag ECU 3. The air bag ECU 3, detecting the acceleration of the collision with the acceleration sensor installed in the air bag ECU 3, compares a predetermined threshold value with an integral value obtained by integrating over a fixed interval the acceleration signal supplied from the acceleration sensor during the collision, and deploys the air bag 2 under a decision that a crash takes place when the integral value exceeds the threshold value. The conventional crash detection apparatus of a vehicle controls the start of the deployment of the air bag 2 in response to the speed of the vehicle 1 at the time when the bumper switch 4 is turned on by the collision, thereby improving the decision performance of the crash.

With the foregoing arrangement, the conventional crash detection apparatus of the vehicle can detect the magnitude of the crash speed correctly within the same crash mode such as a frontal crash. However, besides the frontal crash, the vehicle 1 has other crash modes such as an offset crash, an oblique crash and a pole crash. Among these crash modes, the offset crash and the oblique crash generate an acceleration signal which is low immediately after a crash, but increases thereafter. Thus, the conventional crash detection apparatus of the vehicle, which simply integrates the acceleration signal over the fixed interval, or simply installs an auxiliary sensor such as the bumper switch 4 on the front bumper of the vehicle 1, has a problem of involving a delay in the crash decision.

SUMMARY OF THE INVENTION

The present invention is implemented to solve the foregoing problem. It is therefore an object of the present invention to provide a crash detection apparatus of a vehicle capable of making a more responsive crash decision even in an asymmetric crash mode such as an offset crash or a oblique crash which deforms only one side of a vehicle, and involves a delay in generating a large acceleration signal.

According to a first aspect of the present invention, there is provided a crash detection apparatus of a vehicle comprising: a plurality of collision detectors mounted on different positions of a vehicle for detecting a collision of the vehicle; and a crash mode identifying section for identifying a crash mode of the vehicle by comparing detection signals output from the plurality of collision detectors.

The plurality of collision detectors may each consist of an acceleration sensor for detecting an acceleration of the vehicle at a location at which the acceleration sensor is mounted; and the crash mode identifying section may identify the crash mode of the vehicle from a time difference between timings at which integral values obtained by integrating acceleration signals output from the acceleration sensors exceed a preset threshold value.

The plurality of collision detectors may each consist of an acceleration sensor for detecting an acceleration of the vehicle at a location at which the acceleration sensor is mounted; and the crash mode identifying section may identify the crash mode of the vehicle from a magnitude of a difference between integral values obtained by integrating acceleration signals output from the acceleration sensors.

The plurality of collision detectors may each consist of an acceleration sensor for detecting an acceleration of the vehicle at a location at which the acceleration sensor is mounted; and the crash mode identifying section may identify the crash mode of the vehicle from a time difference between peaks of integral values that are obtained by integrating acceleration signals output from the acceleration sensors.

The plurality of collision detectors may each consist of an acceleration sensor for detecting an acceleration of the vehicle at a location at which the acceleration sensor is mounted, and the crash detection apparatus of a vehicle may further comprise a plurality of filters each for filtering an acceleration signal output from the acceleration sensor.

The plurality of collision detectors may each consist of a mechanical sensor for generating a detection signal in response to an impact exceeding a predetermined level; and the crash mode identifying section may identify the crash mode of the vehicle from a time difference between timings at which the detection signals are output from the mechanical sensors.

The crash detection apparatus of a vehicle may further comprise a crash decision section for making a crash decision that a crash of the vehicle takes place, and the crash mode identifying section may determine a reference level for making the crash decision in accordance with the crash mode identified.

According to a second aspect of the present invention, there is provided a crash detection apparatus of a vehicle comprising: a collision detector mounted on a vehicle for detecting a collision of the vehicle; a first acceleration sensor mounted on the vehicle for detecting an acceleration of the vehicle; and a reference time acquisition section for obtaining from a signal fed from the collision detector a reference time for making a crash mode decision of the vehicle from an acceleration signal output from the first acceleration sensor.

Here, the collision detector may consist of a second acceleration sensor for detecting an acceleration at its mounted position; and the reference time acquisition section may determine, as the reference time for making a crash mode decision of the vehicle, a time at which an integral value obtained by integrating an acceleration signal detected by the second acceleration sensor exceeds a predetermined threshold.

The crash detection apparatus of a vehicle may further comprise a filter for filtering an acceleration signal output from the second acceleration sensor constituting the collision detector.

The collision detector may consist of a mechanical sensor for generating a detection signal in response to an impact exceeding a predetermined level; and the reference time acquisition section may determine, as the reference time for making a crash mode decision of the vehicle, a time at which the detection signal is output from the mechanical sensor.

The crash detection apparatus of a vehicle may further comprise a crash mode decision section for deciding a crash mode by comparing an integral value with a predetermined threshold value, the integral value being obtained by integrating over a predetermined period from the reference time the acceleration signal output from the first acceleration detector.

The collision detector may be mounted at a front of the vehicle, and the first acceleration sensor may be mounted behind the collision detector.

DETAILED DESCRIPTION OF THE PREFERRED EMBODIMENTS

The invention will now be described with reference to the accompanying drawings.

Embodiment 1

Figure 1:
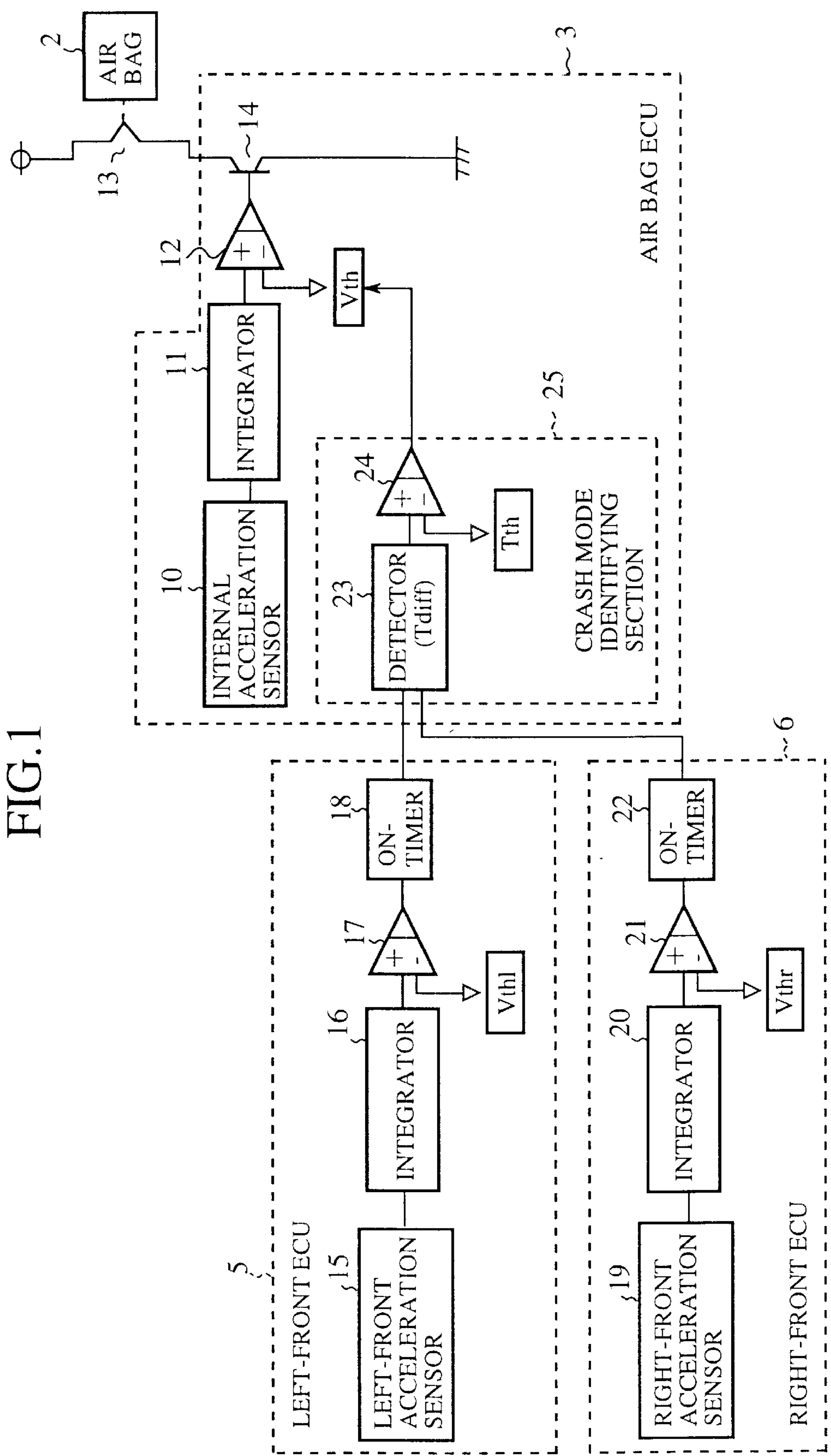
FIG. 1 is a block diagram showing a configuration of an embodiment 1 of a crash detection apparatus of a vehicle in accordance with the present invention.
Figure 2:
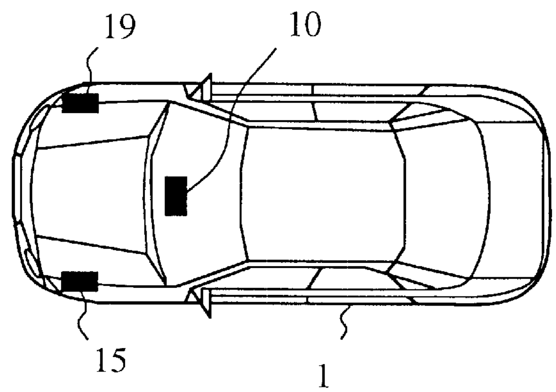
FIG. 2 is a top view showing the placement of acceleration sensors in the embodiment 1.
Figure 23:
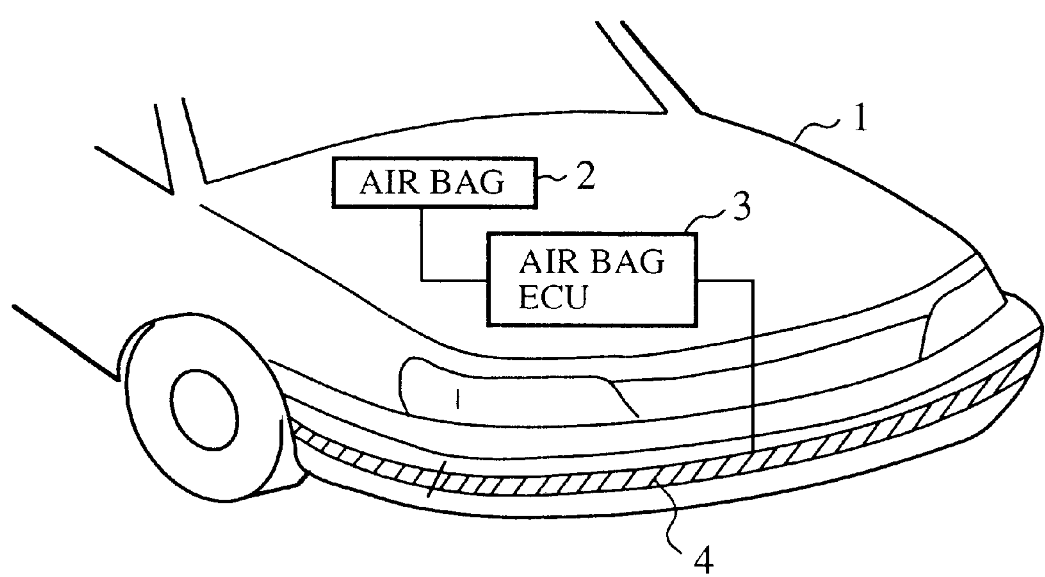
FIG. 23 is a schematic view illustrating a conventional crash detection apparatus of a vehicle.

FIG. 1 is a block diagram showing a configuration of an embodiment 1 of a crash detection apparatus of a vehicle in accordance with the present invention, and FIG. 2 is a top view showing the placement of acceleration sensors in the embodiment 1. The reference numeral 1 in FIG. 2 designates a vehicle; 2 in FIG. 1 designates an air bag as a passenger protective device for protecting the occupants by deploying in the event of a crash of the vehicle 1; and 3 designates an air bag ECU that includes an acceleration sensor and controls the deployment of the air bag 2. These components are the same as those of FIG. 23.

In FIG. 1, the reference numeral 10 designates an acceleration sensor (which will be referred to as "internal acceleration sensor" from now on) which is mounted on the inside of the vehicle 1 for detecting the acceleration of the vehicle 1, and included in the air bag ECU 3. The reference numeral 11 designates an integrator for integrating an acceleration signal output from the internal acceleration sensor 10. The reference numeral 12 designates a comparator for comparing the integral value output from the integrator 11 with a predetermined threshold value Vth to make a decision as to whether the vehicle 1 crashes or not. The threshold value Vth for the crash decision can be switched between the threshold values Vtha and Vthb in accordance with the crash mode of the vehicle 1. The reference numeral 13 designates a squib for deploying the air bag 2; and 14 designates a firing transistor for supplying the squib 13 with a start-up current when the comparator 12 makes a decision that the integral value of the integrator 11 exceeds the threshold value Vtha or Vthb, that is, when the vehicle 1 crashes.

The reference numeral 15 designates an acceleration sensor (referred to as a "left-front acceleration sensor" from now on) mounted on a left side in the front of the vehicle 1 as illustrated in FIG. 2; 16 designates an integrator for integrating an acceleration signal fed from the left-front acceleration sensor 15; 17 designates a comparator for comparing the integral value output from the integrator 16 with a predetermined threshold value Vthl; and 18 designates an on-timer for holding an ON signal for a fixed time period Ttimer when the integral value of the integrator 16 exceeds the threshold value Vthl and hence the comparator 17 turns on. The reference numeral 19 designates an acceleration sensor (referred to as a "right-front acceleration sensor" from now on) mounted on a right side in the front of the vehicle 1 as illustrated in FIG. 2; 20 designates an integrator for integrating an acceleration signal fed from the right-front acceleration sensor 19; 21 designates a comparator for comparing the integral value output from the integrator 20 with a predetermined threshold value Vthr; and 22 designates an on-timer for holding an ON signal for the fixed time period Ttimer when the integral value of the integrator 20 exceeds the threshold value Vthr and hence the comparator 21 turns on.

The reference numeral 23 designates a detector for detecting the time difference Tdiff between the ON timings of the output signals from the comparators 17 and 21; and 24 designates a comparator for comparing the time difference detected by the detector 23 with a predetermined threshold value Tth. The reference numeral 25 designates a crash mode identifying section comprising the detector 23 and the comparator 24. It identifies the crash mode of the vehicle 1 by comparing the time difference Tdiff with the threshold value Tth by the comparator 24, and decides the crash decision threshold value Vth of the comparator 12 at the threshold value Vtha or Vthb.

The reference numeral 3 designates an air bag ECU comprising the internal acceleration sensor 10, integrator 11, comparator 12, firing transistor 14 and the crash mode identifying section 25. The air bag ECU 3 corresponds to the air bag ECU designated by the same reference numeral in FIG. 23. The reference numeral 5 designate a left-front ECU comprising the left-front acceleration sensor 15, integrator 16, comparator 17 and on-timer 18; and 6 designate a right-front ECU comprising the right-front acceleration sensor 19, integrator 20, comparator 21 and on-timer 22.

Next, the operation of the present embodiment 1 will be described.

If the vehicle 1 collides during driving, the internal acceleration sensor 10, left-front acceleration sensor 15 and right-front acceleration sensor 19, which are mounted on the inside, and on the left and right sides in the front of the vehicle 1, respectively, detect the accelerations at the respective positions of the vehicle 1.

The acceleration signal indicative of the acceleration detected by the internal acceleration sensor 10 is input to the integrator 11. The integrator 11 integrates the acceleration signal and supplies the integral value to the comparator 12. In this case, the integrator 11 carries out the integral processing such that the integral value converges to zero after a fixed time period. More specifically, the integrator 11 integrates the acceleration signal with carrying out a reset processing which resets the integral operation at every fixed time period, or a subtraction processing which subtracts a fixed value from the integral value at every fixed time period, so that the integral value during the fixed time period is output each time. The subtraction processing is carried out such that the integral value never falls below zero by subtracting the predetermined value.

The comparator 12 compares the integral value obtained through the reset processing or the subtraction processing by the integrator 11 with the preset threshold value Vth. If the comparator 12 detects that the integral value exceeds the threshold value Vth, it brings the firing transistor 14 into conduction to supply the squib 13 with the start-up current, thereby deploying the air bag 2. The threshold value Vth to be set in advance can be selected from the threshold values Vtha and Vthb which is smaller than Vtha.

The acceleration signal indicative of the acceleration at the left front of the vehicle 1 detected by the left-front acceleration sensor 15, which is mounted on the left-front portion, a crushable zone, of the vehicle, is fed to the integrator 16 that carries out the integral operation through the reset processing or the subtraction processing as the integrator 11. The comparator 17 compares the integral value from the integrator 16 with the preset threshold value Vthl, and turns its output on when the integral value exceeds the threshold value Vthl. The on-timer 18 holds the ON state of the comparator 17 for the fixed time period Ttimer, and supplies its output to the crash mode identifying section 25.

Likewise, the acceleration signal indicative of the acceleration at the right front of the vehicle 1 detected by the right-front acceleration sensor 19, which is mounted on the right-front portion, a crushable zone, of the vehicle, is fed to the integrator 20 that carries out the integral operation through the reset processing or the subtraction processing. The comparator 21 compares the integral value from the integrator 20 with the preset threshold value Vthr, and turns its output on when the integral value exceeds the threshold value Vthr. The on-timer 22 holds the ON state of the comparator 21 for the fixed time period Ttimer, and supplies its output to the crash mode identifying section 25.

In the crash mode identifying section 25, the detector 23 detects the time difference Tdiff between the ON timings of the output signals of the on-timers 18 and 22, and supplies it to the comparator 24. The comparator 24 compares the time difference Tdiff with the threshold value Tth to make a decision whether to use the threshold value Vtha or Vthb as the variable threshold value Vth of the comparator 12.

The foregoing operation will now be described in more detail with reference to FIGS. 3, 4 and 5.

Figure 3:
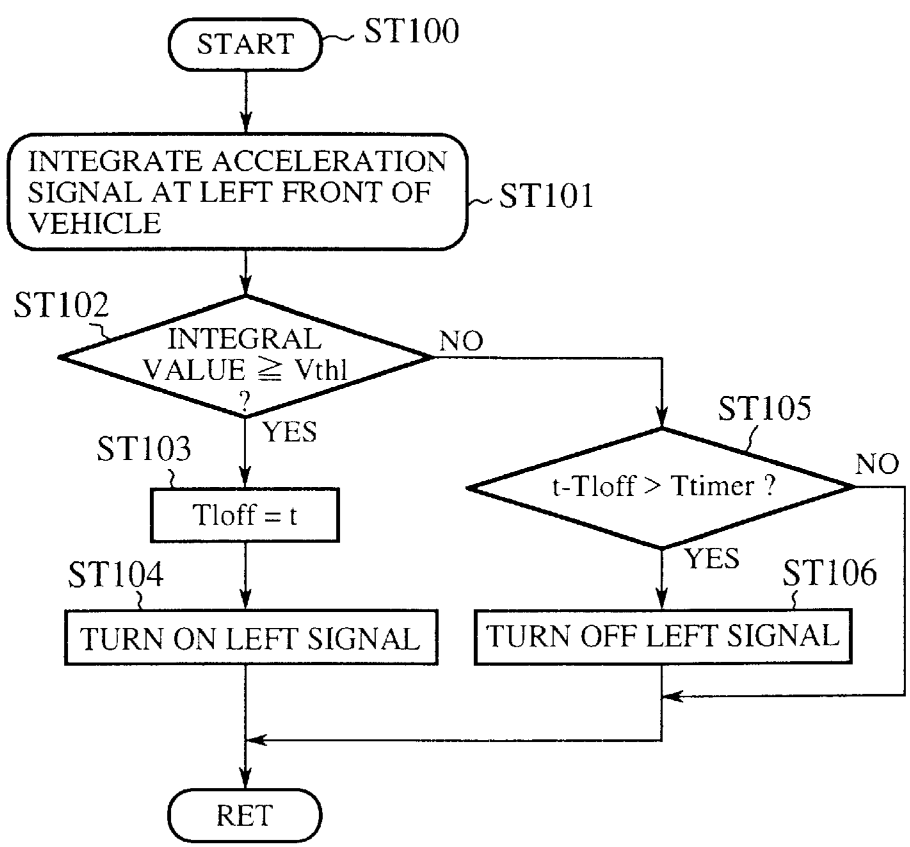
FIG. 3 is a flowchart illustrating the operation of a left-front ECU in the embodiment 1.

FIG. 3 is a flowchart illustrating a processing in the left-front ECU 5. When the left-front ECU 5 starts its processing at step ST100, the integrator 16 carries out at step ST101 the integral of the acceleration signal fed from the left-front acceleration sensor 15 using the reset processing or the subtraction processing mentioned above. At the next step ST102, the comparator 17 compares the integral value obtained at step ST101 with the preset threshold value Vthl to make a decision as to whether the integral value exceeds the threshold value. If the decision is made that the integral value exceeds the threshold value Vthl, the instant time t at which the decision is made is placed at Tloff at step ST103. Then, the comparator 17 sets its output at ON at step ST104.

In contrast, if the decision is made at step ST102 that the integral value does not exceed the threshold value, a decision is made at step ST105 as to whether the time difference between the present time t and the time Tloff, at which the latest decision result of the left-front ECU 5 is turned off, is greater than the hold time Ttimer of the on-timer 18. If the decision is made that the time difference is greater than the hold time Ttimer, the decision result of the left-front ECU 5 is placed at OFF at step ST106. Once completed, the forgoing processings are started again.

Figure 4:
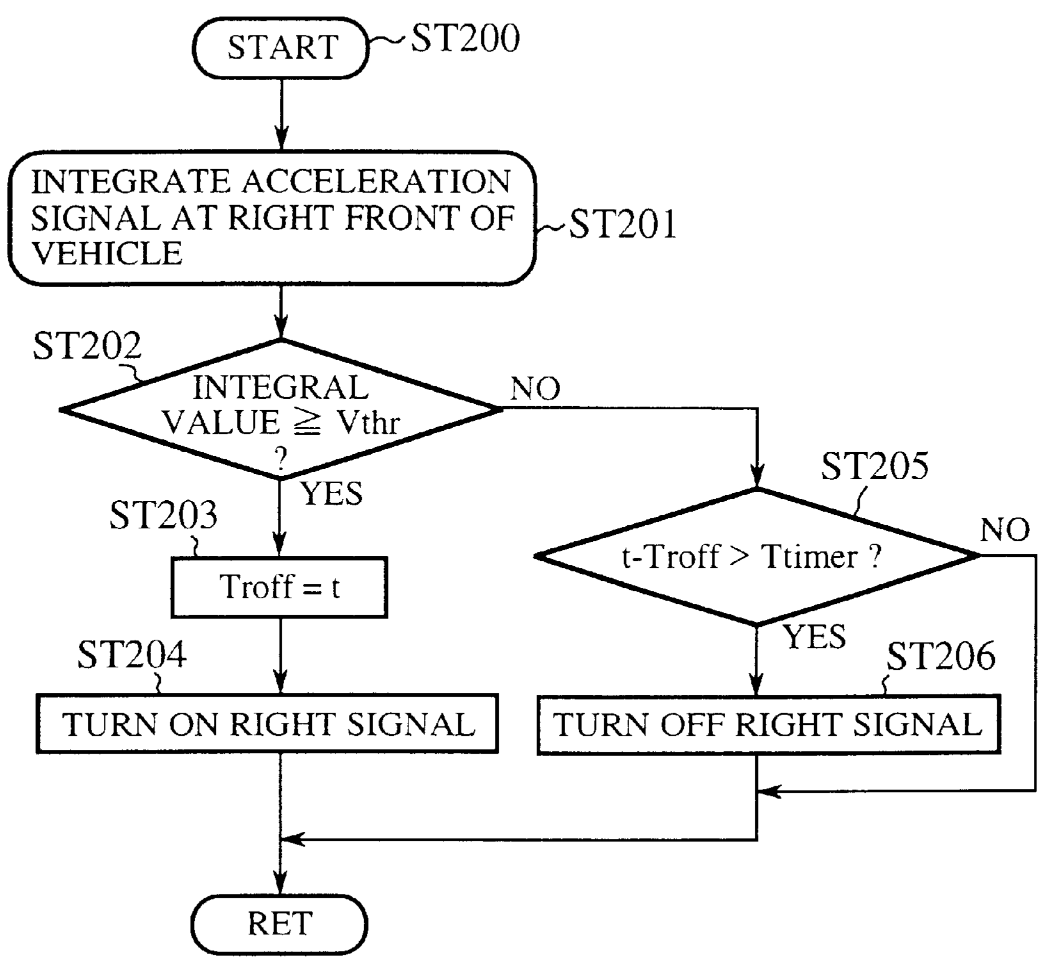
FIG. 4 is a flowchart illustrating the operation of a right-front ECU in the embodiment 1.

FIG. 4 is a flowchart illustrating a processing in the right-front ECU 6, which is carried out through steps ST200-ST206 as illustrated in FIG. 4 in a manner similar to the processing in the left-front ECU 5 as described above in connection with FIG. 3.

Figure 5:
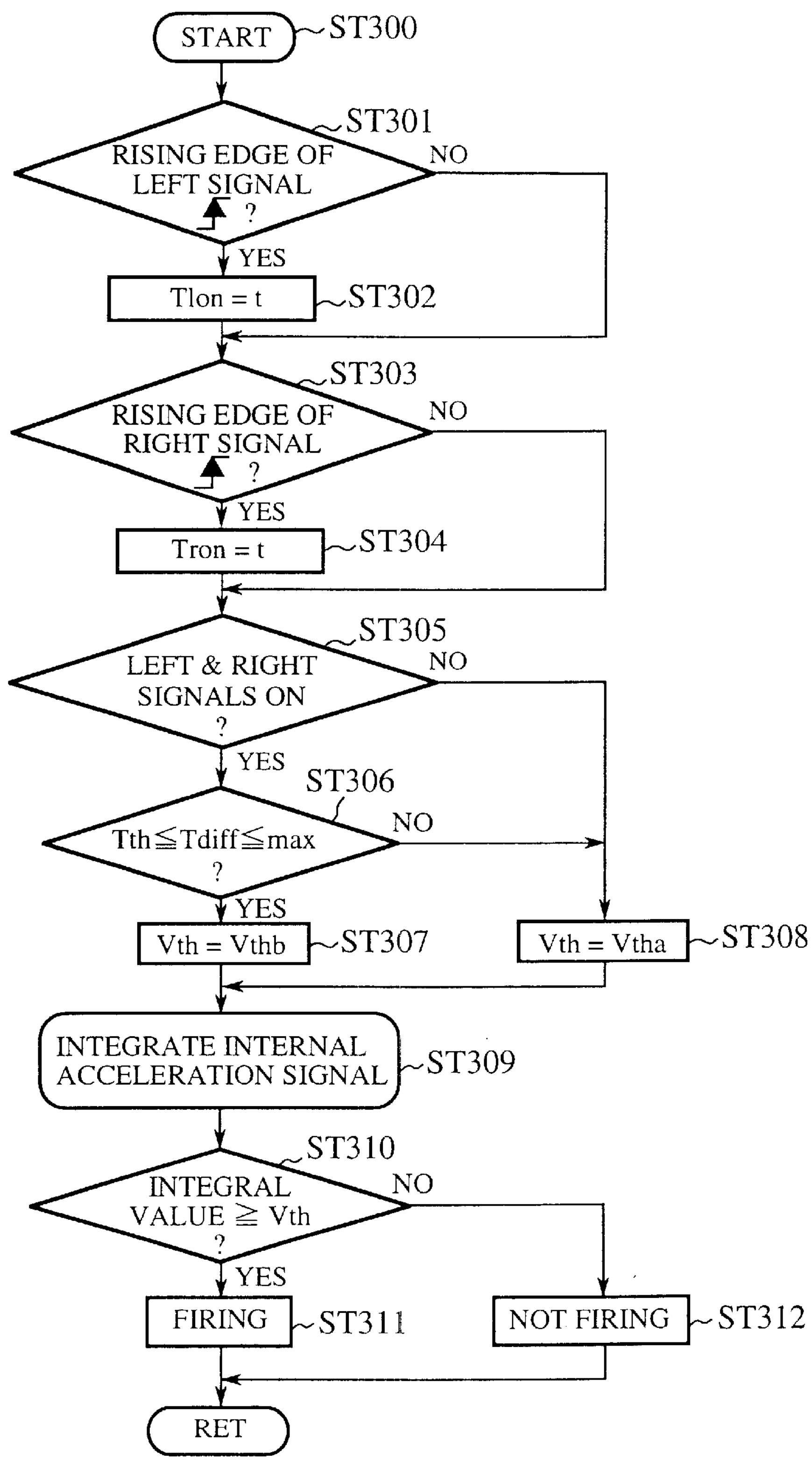
FIG. 5 is a flowchart illustrating the operation of an air bag ECU in the embodiment 1.

FIG. 5 is a flowchart illustrating the processing in the air bag ECU 3. When the operation of the air bag ECU 3 starts at step ST300, the crash mode identifying section 25 detects at steps ST301 and ST303 the rising edge of the LEFT signal (ON signal of the left-front ECU 5) and the RIGHT signal (ON signal of the right-front ECU 6), and places the ON start time of the LEFT signal and that of the RIGHT signal at Tlon and Tron, respectively, at steps ST302 and 304. At the next step ST305, a decision is made as to whether both the LEFT signal and the RIGHT signal are ON or not.

If a decision is made that both of them are ON, the time difference Tdiff between the ON start times Tlon and Tron is compared with the threshold values Tth and Tmax at step ST306. If the time difference Tdiff is present between the threshold values Tth and Tmax (that is, Tth≦Tdiff≦Tmax), the threshold value Vth of the comparator 12 is set at Vthb at step ST307. In contrast, if at least one of the LEFT and RIGHT signals is not ON, or the time difference Tdiff is not between the threshold values Tth and Tmax, the threshold value Vth of the comparator 12 is set at Vtha step ST308. Thus, only when both the left-front ECU 5 and right-front ECU 6 are ON and Tth≦Tdiff≦Tmax, the threshold value Vth of the comparator 12 is changed to the threshold value Vthb smaller than the threshold value Vtha.

At the next step ST309, using the reset processing or the subtraction processing described above, the integrator 11 obtains the integral of the acceleration signal fed from the internal acceleration sensor 10. At step ST310, the comparator 12 compares the integral value obtained by the integrator 11 with the threshold value Vth determined at step ST308 or ST309. If a decision is made as a result of the comparison that the integral value exceeds the threshold value Vth, the firing transistor 14 is supplied with the firing signal step ST311. On the contrary, if the integral value does not exceed the threshold value Vth, the output of the firing signal is inhibited step ST612. After completing the foregoing steps, the processing from the step ST300 and so forth is started again.

Figure 6A:
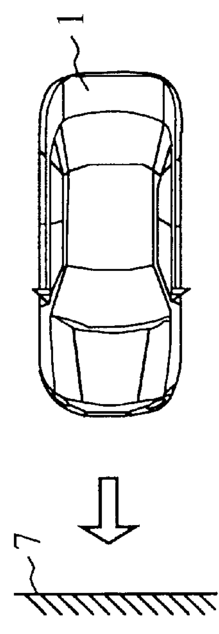
FIGS. 6A–6D are top views illustrating the types of crash modes of a vehicle.
Figure 6B:
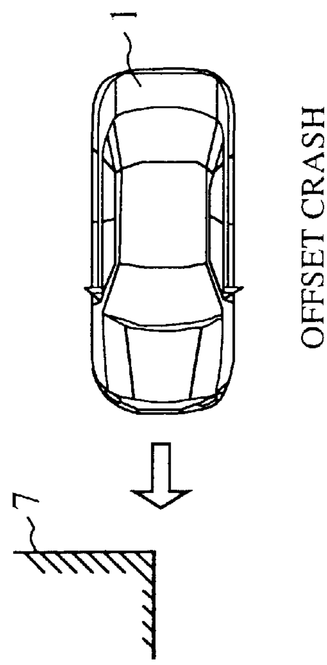
Figure 6C:
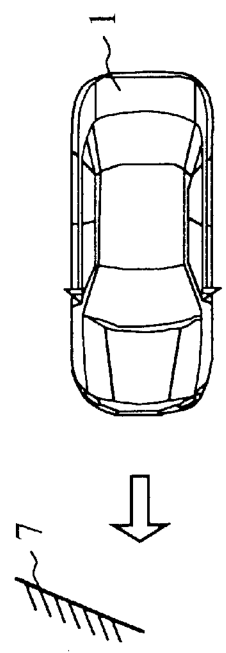
Figure 6D:
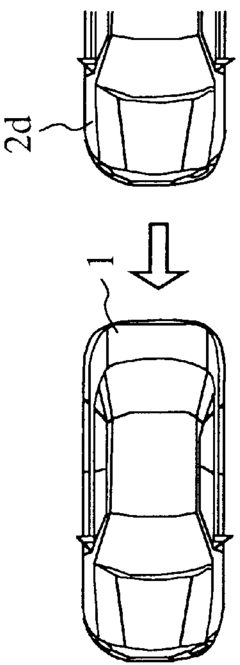

FIGS. 6A–6D are top views illustrating the crash modes, in which the reference numeral 7 designates a barrier. FIG. 6A illustrates the frontal crash in which the vehicle 1 collides against the barrier 7 right in front; FIG. 6B illustrates the offset crash in which the vehicle 1 collides with the barrier 7 at the left or right side; FIG. 6C illustrates the oblique crash in which the vehicle 1 collides obliquely against the frontal barrier 7; and FIG. 6D illustrates the rear crash in which the vehicle 1 is collided with another vehicle 2*d* or the like from behind.

Figure 7:
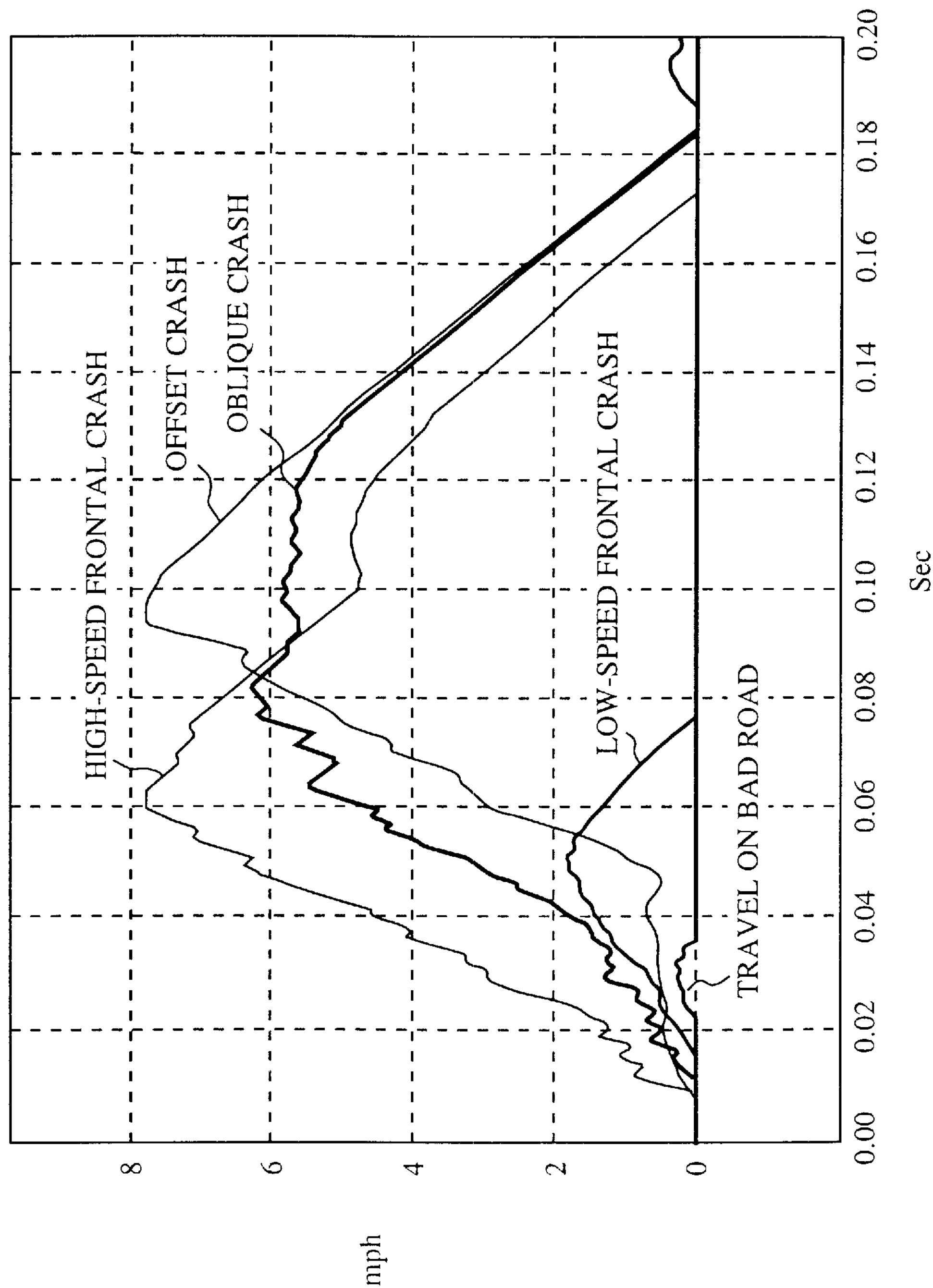
FIG. 7 is a waveform diagram illustrating characteristics of the crash modes.

FIG. 7 is a graph illustrating waveforms of the crash modes, that is, variations in the integral values with time, which are obtained by the integrator 11 that integrates the acceleration signal detected by the internal acceleration sensor 10 using the reset processing or the subtraction processing. As illustrated in FIG. 7, although the integral value of an asymmetric crash such as the offset crash or oblique crash takes a value lower than that of a symmetric crash like the high-speed frontal crash immediately after the crash, it increases to greater values thereafter. FIG. 7 also illustrates the waveforms of a low-speed frontal crash and a bad road traveling, in which the deployment of the air bag 2 is not necessary.

Figure 8:
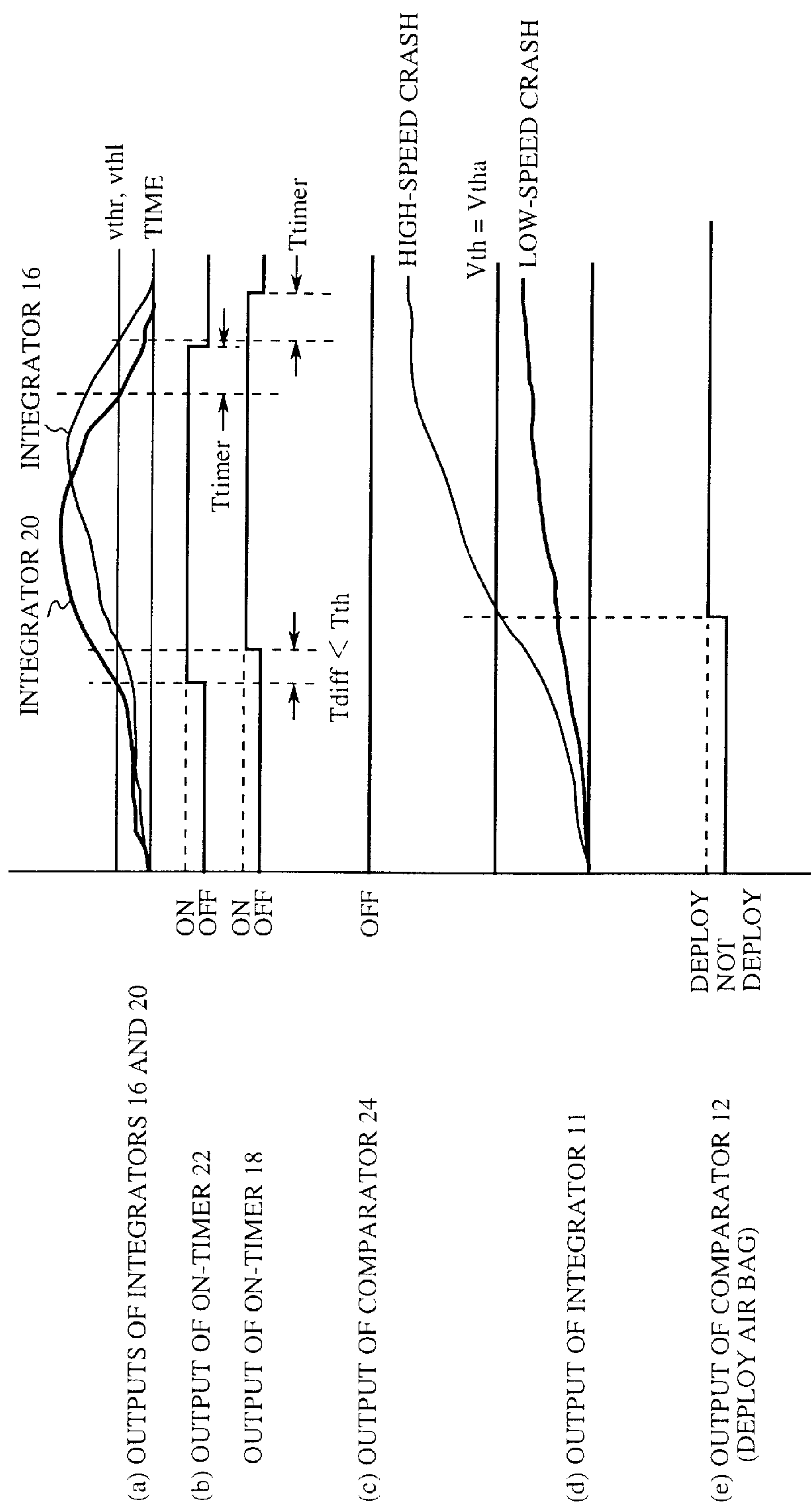
FIG. 8 is a diagram illustrating waveforms of various portions in the embodiment 1 in a low-speed frontal crash and a high-speed frontal crash.

In the frontal crash as illustrated in FIG. 6A, for example, the front of the vehicle 1 is deformed by a symmetric impact. FIG. 8 illustrates waveforms of low-speed and high-speed frontal crashes: FIG. 8(*a*) illustrates the integral values output from the integrators 16 and 20; FIG. 8(*b*) illustrates the output signals of the on-timers 18 and 22; FIG. 8(*c*) illustrates a decision signal output from the comparator 24; FIG. 8(*d*) illustrates the integral value output from the integrator 11; and FIG. 8(*e*) illustrates the output signal of the comparator 12.

In the frontal crash as shown in FIG. 6A, the integral values of the integrators 16 and 20 vary at similar rates as illustrated in FIG. 8(*a*), where the integral values are obtained by the integrators 16 and 20 that integrate, through the reset processing and the subtraction processing, the acceleration signals supplied from the left-front acceleration sensor 15 and right-front acceleration sensor 19 mounted on the left and right sides in the front of the vehicle 1 as shown in FIG. 2. Accordingly, the timings at which the integral values reach the threshold values Vthl and Vthr have only a small difference as illustrated in FIG. 8(*b*), so that the time difference Tdiff obtained by the detector 23 in the crash mode identifying section 25 is smaller than the threshold value Tth of the comparator 24. Thus, the output signal of the comparator 24 is maintained at the OFF state as illustrated in FIG. 8(*c*), in which case, a decision is made that the crash is symmetric. As a result, the threshold value Vth, which is provided from the crash mode identifying section 25 to the comparator 12 as the reference for making the crash decision, is maintained at the threshold value Vtha.

The comparator 12 compares the threshold value Vtha with the integral value which is obtained by the integrator 11 that integrates, through the reset processing or the subtraction processing, the acceleration signal supplied from the internal acceleration sensor 10. In the high-speed crash, since the integral value of the integrator 11 exceeds the threshold value Vtha as illustrated in FIG. 8(*d*), a decision is made that the vehicle 1 crashes against the barrier. In response to the decision, the comparator 12 supplies the firing transistor 14 with the signal as illustrated in FIG. 8(*e*), which brings the firing transistor 14 into conduction. Thus, the squib 13 is supplied with the start-up current, and the air bag 2 is deployed. In contrast, in the low-speed crash, since the integral value of the integrator 11 does not exceed the threshold value Vtha, a decision is made that the vehicle 1 does not crash against the barrier. Accordingly, the output of the comparator 12 does not bring the firing transistor 14 into conduction. Thus, the squib 13 is not supplied with the start-up current, and the air bag 2 is not deployed.

Figure 9:
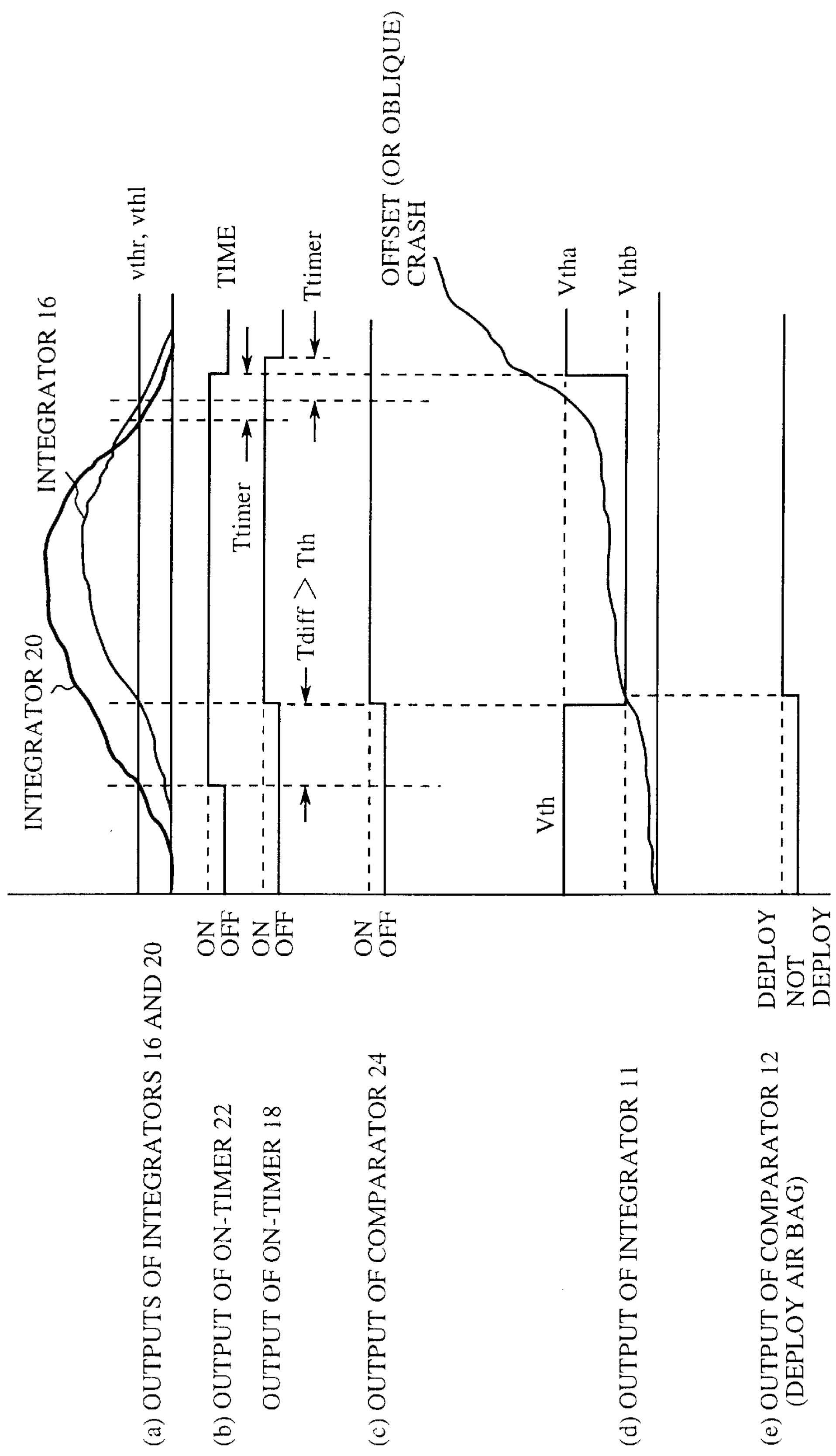
FIG. 9 is a diagram illustrating waveforms of various portions in the embodiment 1 in an offset crash.

In contrast with the symmetric crash as described above, in the asymmetric crash such as the offset crash or oblique crash as shown in FIGS. 6B and 6C, the front of the vehicle is deformed asymmetrically by the impact of the collision. FIG. 9 illustrates waveforms of various portions at the offset crash or the oblique crash: FIG. 9(*a*) illustrates the integral values output from the integrators 16 and 20; FIG. 9(*b*) illustrates the output signals of the on-timers 18 and 22; FIG. 9(*c*) illustrates a decision signal output from the comparator 24; FIG. 9(*d*) illustrates the integral value output from the integrator 11; and FIG. 9(*e*) illustrates the output signal of the comparator 12.

In the offset crash or oblique crash as shown in FIGS. 6B and 6C, the integral values of the integrators 16 and 20 vary at markedly different rates as illustrated in FIG. 9(*a*), where the integral values are obtained by the integrators 16 and 20 that integrate, through the reset processing and the subtraction processing, the acceleration signals supplied from the left-front acceleration sensor 15 and right-front acceleration sensor 19. Accordingly, the timings at which the integral values reach the threshold values Vthl and Vthr have a large time difference as illustrated in FIG. 9(*b*), so that the time difference Tdiff obtained by the detector 23 in the crash mode identifying section 25 is greater than the threshold value Tth of the comparator 24. Thus, the output signal of the comparator 24 changes from the OFF state to the ON state as illustrated in FIG. 9(*c*), in which case, a decision is made that the crash is asymmetric. As a result, the threshold value Vth, which is provided to the comparator 12 as the reference level for the crash decision, is changed from the threshold value Vtha to the smaller threshold value Vthb as illustrated in FIG. 9(*d*) at the time when the output of the comparator 24 of the crash mode identifying section 25 makes a transition.

The comparator 12 compares the threshold value Vthb smaller than the threshold value Vtha with the integral value which is obtained by the integrator 11 that integrates, through the reset processing or the subtraction processing, the acceleration signal supplied from the internal acceleration sensor 10. Thus, even in the asymmetric collision such as the offset crash or oblique crash in which only one side of the vehicle 1 deforms greatly and the generation of the large acceleration signal is delayed, the integral value of the integrator 11 quickly exceeds the threshold value Vthb as illustrated in FIG. 9(*d*), and a decision is made that the vehicle 1 collides with the barrier. In response to the decision, the comparator 12 supplies the firing transistor 14 with the signal as illustrated in FIG. 9(*e*), which brings the firing transistor 14 into conduction. Thus, the squib 13 is supplied with the start-up current, and the air bag 2 is deployed.

Figure 10:
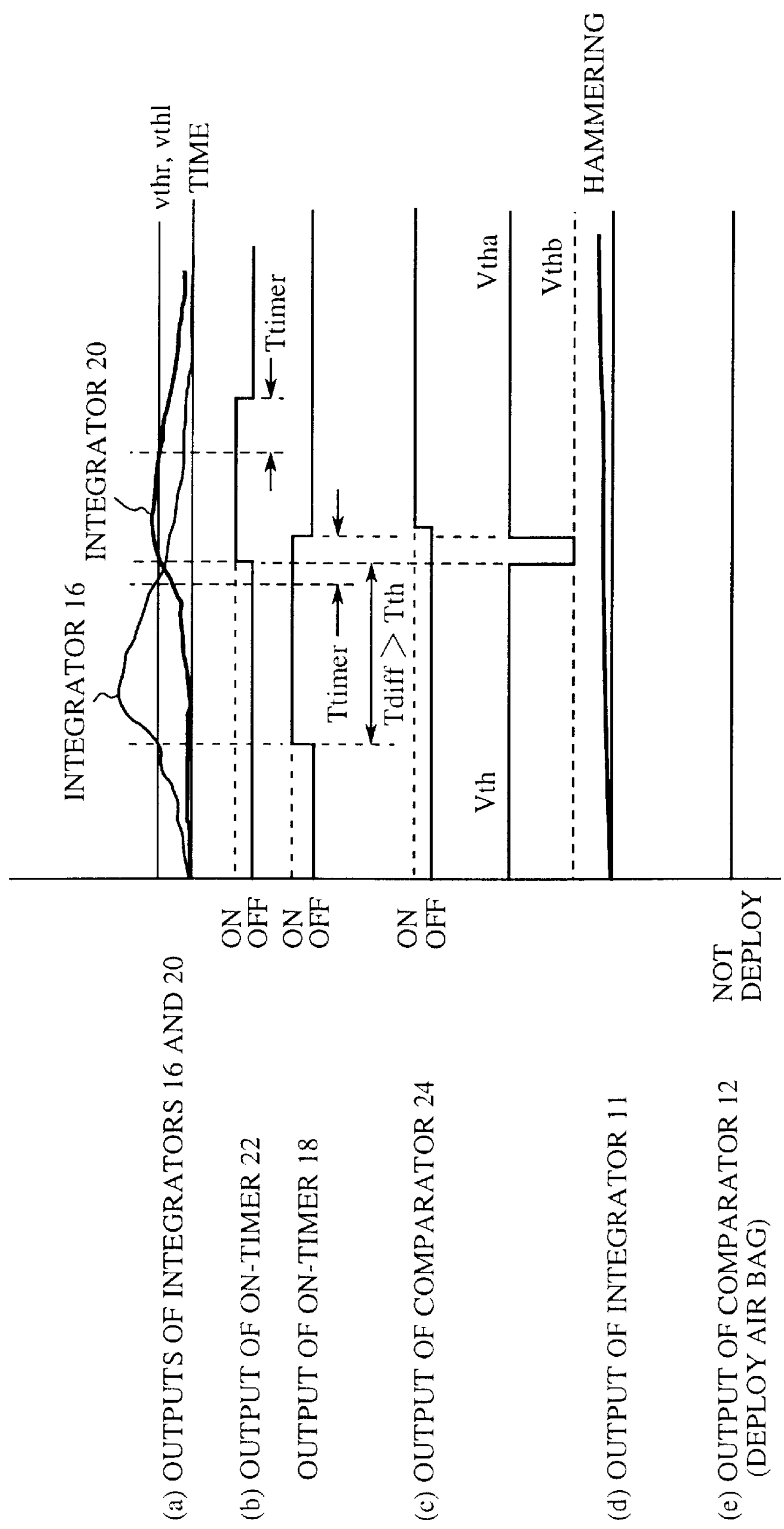
FIG. 10 is a diagram illustrating waveforms of various portions in the embodiment 1 in a hammering.

Sometimes an impact is transferred to the internal acceleration sensor 10 even in a mode such as a frontal hammering of the vehicle 1, which differs from the true collision, in which case the air bag 2 must not be deployed. The control in such a case will now be described with reference to FIG. 10. FIG. 10 illustrates waveforms of various portions in the hammering: FIG. 10(*a*) illustrates the integral values output from the integrators 16 and 20; FIG. 10(*b*) illustrates the output signals of the on-timers 18 and 22; FIG. 10(*c*) illustrates a decision signal output from the comparator 24; FIG. 10(*d*) illustrates the integral value output from the integrator 11; and FIG. 8(*e*) illustrates the output signal of the comparator 12.

In the hammering, the integral values of the integrators 16 and 20 vary with different peaks as illustrated in FIG. 10(*a*), where the integral values are obtained by the integrators 16 and 20 that integrate, through the reset processing and the subtraction processing, the acceleration signals supplied from the left-front acceleration sensor 15 and right-front acceleration sensor 19. Thus, if the integral values reach the threshold values Vthl and Vthr, and have a time difference Tdiff greater than the threshold value Tth of the comparator 24 as illustrated in FIG. 10(*b*), the output signal of the comparator 24 changes from the OFF state to the ON state as illustrated in FIG. 10 (c). In this case, a decision is made that the crash is asymmetric, and the threshold value Vth of the comparator 12 can sometimes be changed temporarily to the threshold value Vthb as illustrated in FIG. 10(*d*). However, since the value of the acceleration signal fed from the internal acceleration sensor 10 is small, the integral value, which the integrator 11 obtains by integrating the acceleration signal through the reset processing and subtraction processing, does not exceed the threshold value Vth as illustrated in FIG. 10(*d*). This can prevent an erroneous decision that the vehicle 1 collides with the barrier, thereby preventing the air bag 2 from being deployed.

Figure 11:
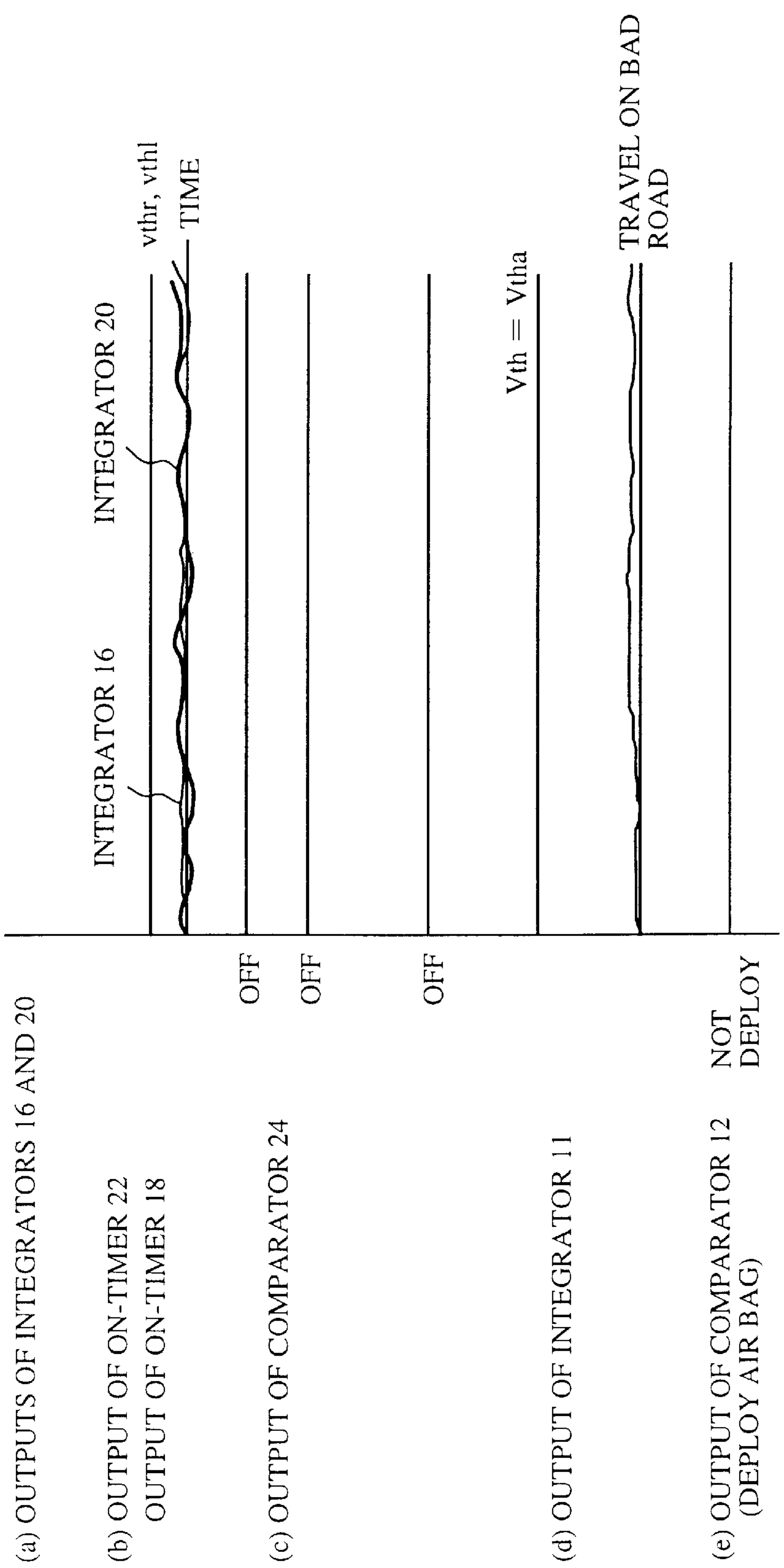
FIG. 11 is a diagram illustrating waveforms of various portions in the embodiment 1 in a bad road traveling.

Likewise, an impact can sometimes be transferred the internal acceleration sensor 10 even in a mode such as a bad road traveling, in which case the air bag 2 must not be deployed. The control in such a case will now be described with reference to FIG. 11. FIG. 11 illustrates waveforms of various portions in the bad road traveling: FIG. 11(*a*) illustrates the integral values output from the integrators 16 and 20; FIG. 11(*b*) illustrates the output signals of the on-timers 18 and 22; FIG. 11(*c*) illustrates a decision signal output from the comparator 24; FIG. 11(*d*) illustrates the integral value output from the integrator 11; and FIG. 11(*e*) illustrates the output signal of the comparator 12.

In the bad road traveling, the integral values of the integrators 16 and 20 are very small as illustrated in FIG. 11(*a*), where the integral values are obtained by the integrators 16 and 20 that integrate, through the reset processing and the subtraction processing, the acceleration signals supplied from the left-front acceleration sensor 15 and right-front acceleration sensor 19. Thus, the integral values never reach the threshold value Vthl or Vthr, and hence the threshold value Vth of the comparator 12 as the reference level for the crash decision is not changed by the output from the comparator 24. As a result, the integral value, which the integrator 11 obtains by integrating the acceleration signal fed from the internal acceleration sensor 10, does not exceed the threshold value Vth (=Vtha) of the comparator 24. This can prevent the air bag 2 from being deployed erroneously.

Embodiment 2

The foregoing embodiment 1 obtains by the integrators 16 and 20 the integral values of the acceleration signals supplied from the left-front acceleration sensor 15 and right-front acceleration sensor 19 mounted on the left and right front of the vehicle 1, compares the timings at which the integral values exceed the preset threshold values, and identifies the crash mode of the vehicle 1 from the magnitude of the time difference. This, however, is not essential. For example, identification of the crash mode such as asymmetric collision can be implemented by comparing the difference between the integral values of the integrators 16 and 20 with a preset threshold value.

Figure 12:
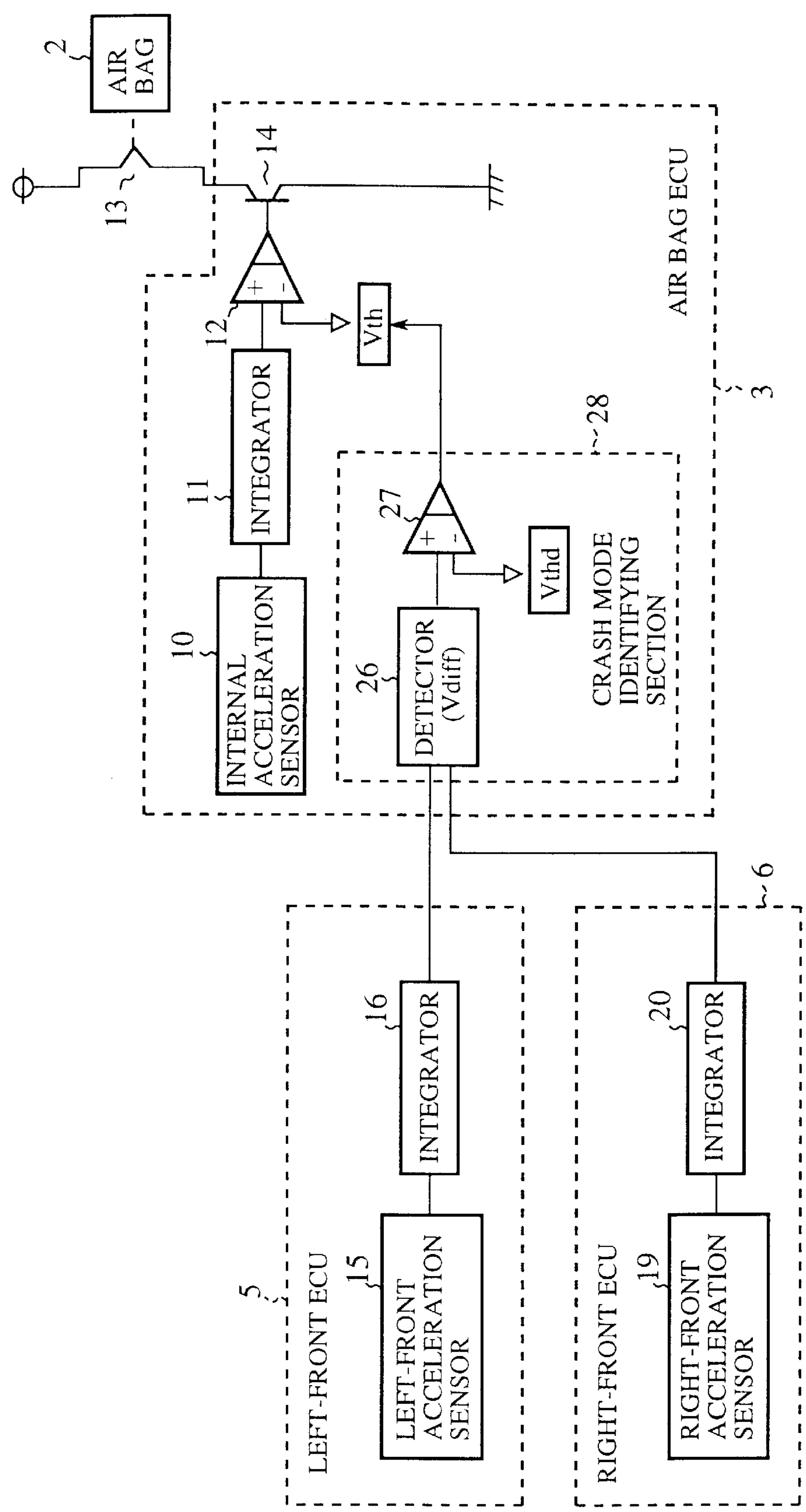
FIG. 12 is a block diagram showing a configuration of an embodiment 2 of the crash detection apparatus of a vehicle in accordance with the present invention.

FIG. 12 is a block diagram showing a configuration of such an embodiment 2 of the crash detection apparatus of a vehicle in accordance with the present invention, in which corresponding portions to those of FIG. 1 are designated by the same reference numerals, and the description thereof is omitted here. In FIG. 12, the reference numeral 26 designates a detector for detecting the difference Vdiff between the integral values the integrators 16 and 20 obtain by integrating through the reset processing and subtraction processing the acceleration signals fed from the left-front acceleration sensor 15 and right-front acceleration sensor 19, respectively. The reference numeral 27 designates a comparator for comparing the difference Vdiff between the integral values, which is output from the detector 26, with a preset threshold value Vthd. The reference numeral 28 designates a crash mode identifying section which comprises the detector 26 and comparator 27, identifies the crash mode of the vehicle 1 from the compared result by the comparator 27, and makes a decision whether to switch the threshold value Vth used as the reference level for making the crash decision by the comparator 12, from the threshold value Vtha to the threshold value Vthb.

Next, the operation of the present embodiment 2 will be described.

Since the basic operation is the same as that of the embodiment 1, only different operation will be mainly described here. In a symmetric collision, the integral values output from the integrators 16 and 20 take similar values as illustrated in FIG. 8(*a*). In contrast with this, in an asymmetric collision, the integral values have considerable differences at respective points as illustrated in FIG. 9(*a*). The detector 26 of the crash mode identifying section 28 detects the difference Vdiff between the integral values output from the integrators 16 and 20, and supplies it to the comparator 27. The comparator 27 compares the difference Vdiff between the integral values with the predetermined threshold value Vthd. When the difference Vdiff between the integral values is greater than the threshold value Vthd, the comparator 27 makes a decision that the collision is asymmetric, and changes the threshold value Vth supplied to the comparator 12 as the crash decision reference from the threshold Vtha to the smaller threshold value Vthb.

Embodiment 3

The foregoing embodiments obtain the integral values of the acceleration signals supplied from the left-front acceleration sensor 15 and right-front acceleration sensor 19, compare the preset threshold value with the timing difference at which the integral values exceed the preset threshold values, or with the difference between the integral values, and identify the crash mode such as the asymmetric collision. This, however, is not essential. For example, identification of the crash mode of the vehicle can be implemented by comparing the timing difference between the peaks of the integral values with a preset threshold value.

Figure 13:
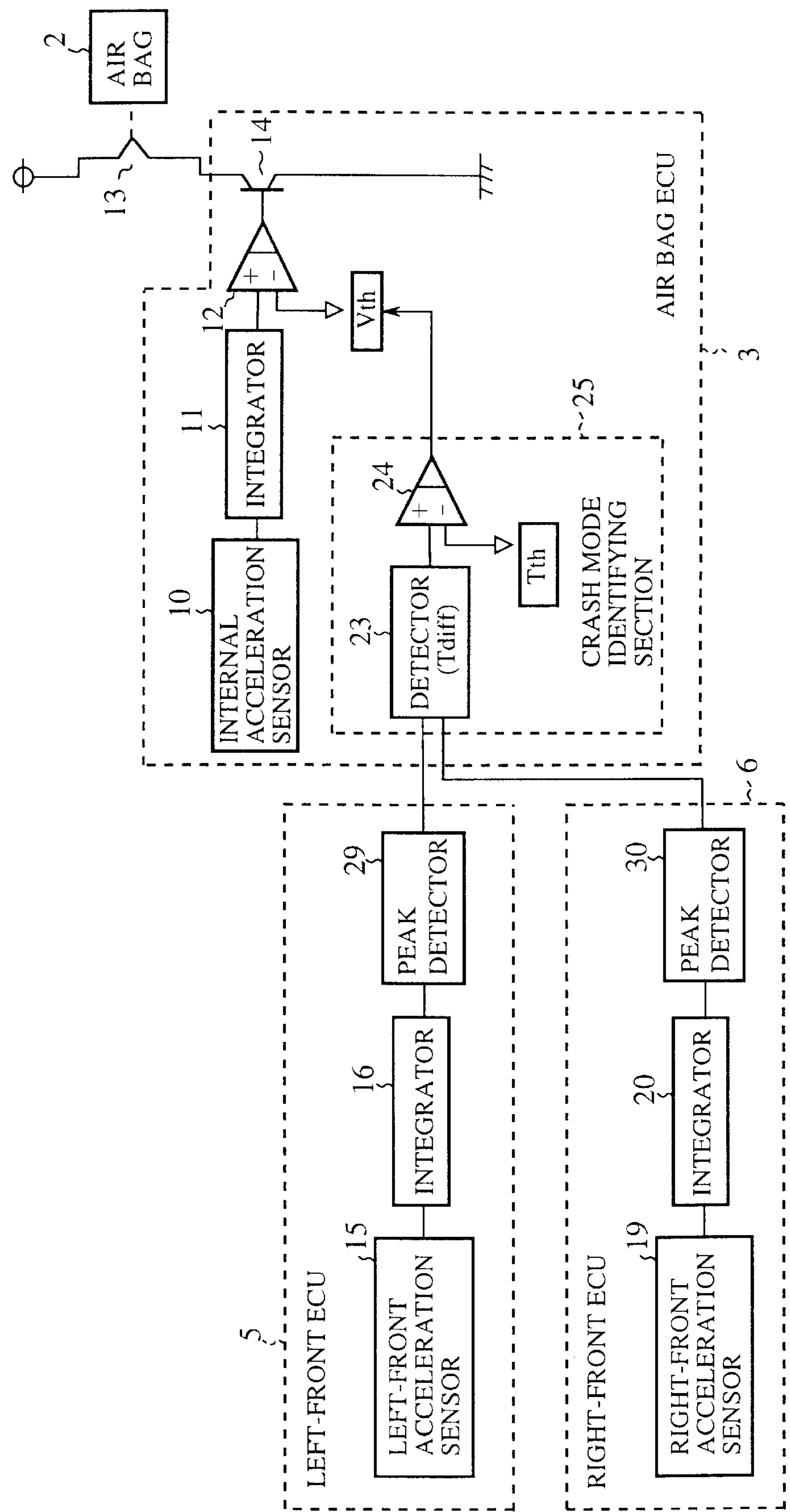
FIG. 13 is a block diagram showing a configuration of an embodiment 3 of the crash detection apparatus of a vehicle in accordance with the present invention.

FIG. 13 is a block diagram showing a configuration of such an embodiment 3 of the crash detection apparatus of the vehicle in accordance with the present invention, in which corresponding portions to those of FIG. 1 are designated by the same reference numerals, and the description thereof is omitted here. In FIG. 13, the reference numeral 29 designates a peak detector for detecting a peak of the integral value obtained by the integrator 16 that integrates the acceleration signal fed from the left-front acceleration sensor 15; and the reference numeral 30 designates a peak detector for detecting a peak of the integral value obtained by the integrator 20 that integrates the acceleration signal fed from the right-front acceleration sensor 19. The outputs of the peak detectors 29 and 30 are supplied to the detector 23 in the crash mode identifying section 25.

Next, the operation of the present embodiment 3 will be described.

Since the basic operation is the same as that of the embodiment 1, only different operation will be mainly described here. The integral values from the integrators 16 and 20 are supplied to the peak detectors 29 and 30 which detect their peaks. In a symmetric collision, since the integral values output from the integrators 16 and 20 exhibit similar increasing processes as illustrated in FIG. 8(*a*), the timing difference between the peaks detected by the peak detectors 29 and 30 is small. In contrast with this, in an asymmetric collision, since the integral values exhibit markedly different increasing processes as illustrated in FIG. 9(*a*), the timing difference between the peaks detected by the peak detectors 29 and 30 is large. In the crash mode identifying section 25, the detector 23 detects the timing difference Tdiff between the peaks, and the comparator 24 compares the difference Tdiff with the predetermined threshold value Tth to identify the crash mode.

Embodiment 4

The foregoing embodiments identify the crash mode by using the acceleration signals obtained by the left-front acceleration sensor 15 and right-front acceleration sensor 19 without adding any change to the acceleration signals. This, however, is not essential. For example, the acceleration signals obtained by the left-front acceleration sensor 15 and right-front acceleration sensor 19 can undergo filtering before identifying the crash mode of the vehicle.

Figure 14:
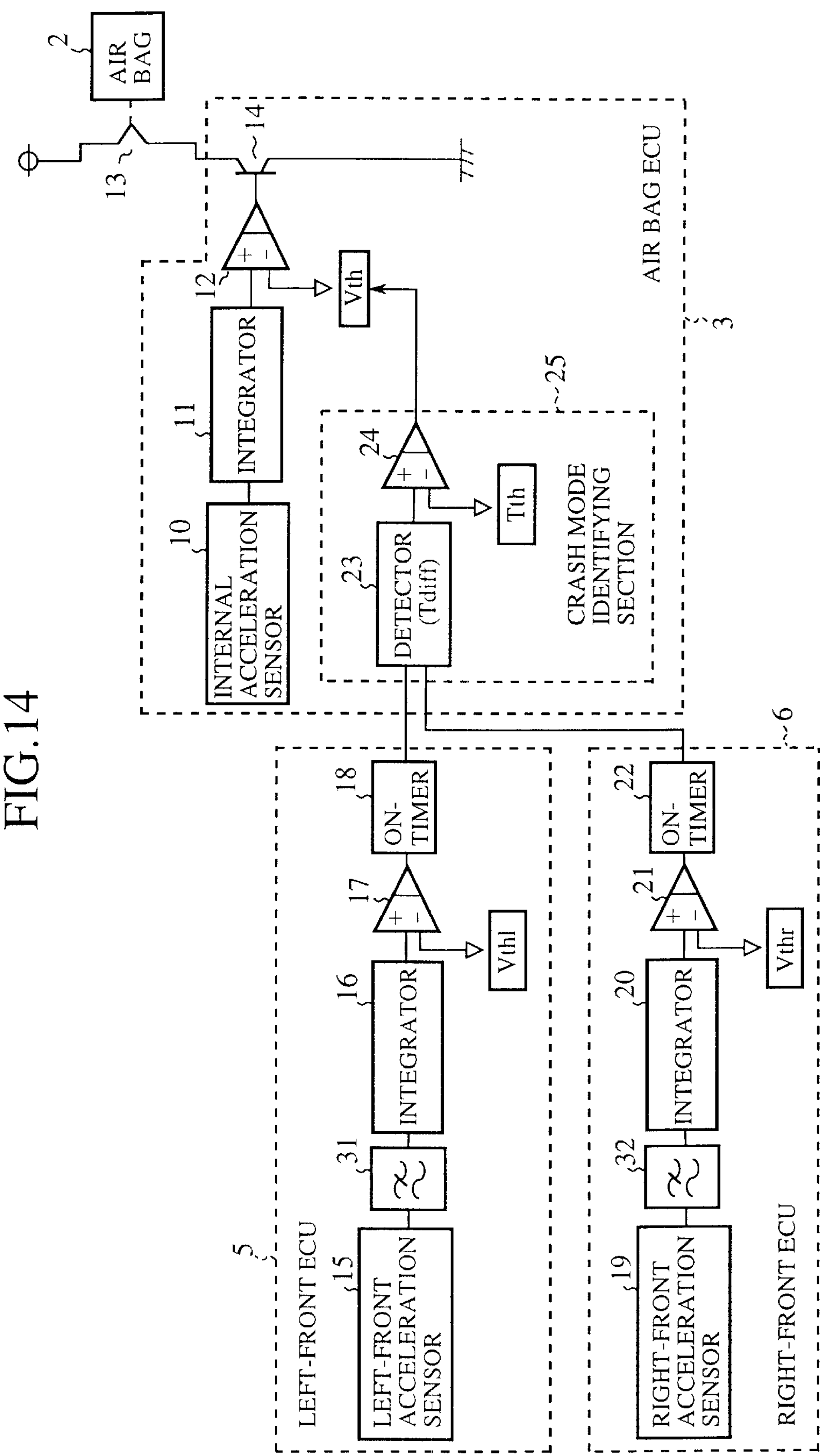
FIG. 14 is a block diagram showing a configuration of an embodiment 4 of the crash detection apparatus of a vehicle in accordance with the present invention.

FIG. 14 is a block diagram showing a configuration of such an embodiment 4 of the crash detection apparatus of a vehicle in accordance with the present invention, in which corresponding portions to those of FIG. 1 are designated by the same reference numerals, and the description thereof is omitted here. In FIG. 14, the reference numeral 31 designates a filter for filtering the acceleration signal obtained by the left-front acceleration sensor 15; and 32 designates a filter for filtering the acceleration signal obtained by the right-front acceleration sensor 19. The outputs of the filters 31 and 32 are supplied to the integrators 16 and 20, respectively.

Next, the operation of the present embodiment 4 will be described.

Since the basic operation is the same as that of the embodiment 1, only different operation will be mainly described here. The acceleration signal obtained by the left-front acceleration sensor 15 is supplied to the filter 31 to be filtered, and the acceleration signal obtained by the right-front acceleration sensor 19 is supplied to the filter 32 to be filtered. The filters 31 and 32 each consist of a low-pass filter which removes high-frequency components to reduce abruptly varying components such as noise in the signals to be supplied to the integrator 16 and 20. Subsequently, the crash mode identifying section 25 identifies the crash mode of the vehicle 1 in a manner similar to that of the embodiment 1.

Embodiment 5

The foregoing embodiments employ as collision detectors the left-front acceleration sensor 15 and right-front acceleration sensor 19, which are mounted on the left and right sides in the front of the vehicle. This, however, is not essential. For example, as the collision detectors, mechanical sensors can be used which are mounted on the left and right sides in the front of the vehicle.

Figure 15:
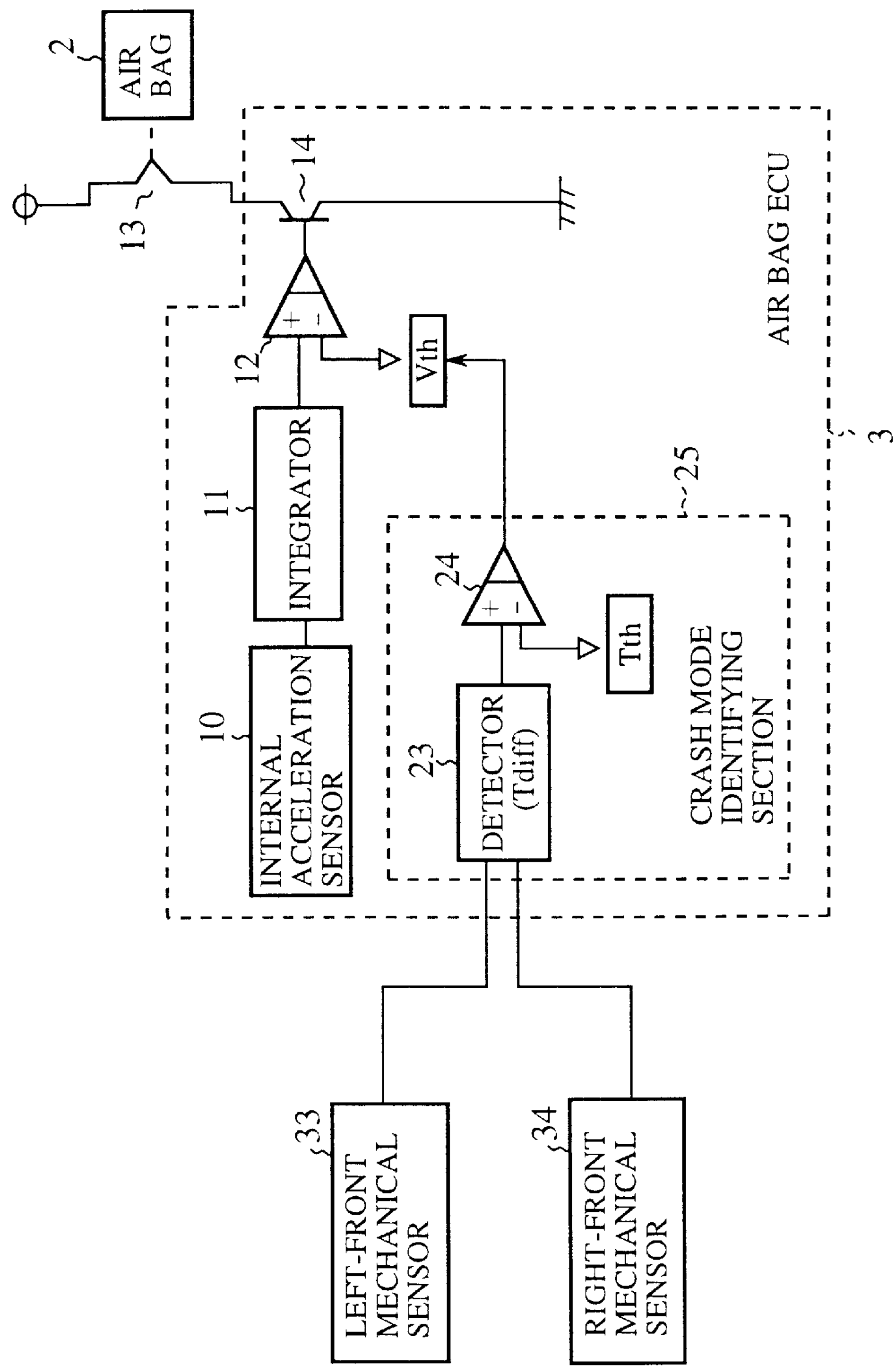
FIG. 15 is a block diagram showing a configuration of an embodiment 5 of the crash detection apparatus of a vehicle in accordance with the present invention.

FIG. 15 is a block diagram showing a configuration of such an embodiment 5 of the crash detection apparatus of a vehicle in accordance with the present invention, in which corresponding portions to those of FIG. 1 are designated by the same reference numerals, and the description thereof is omitted here. In FIG. 15, the reference numeral 33 designates a mechanical sensor (referred to as "left-front mechanical sensor" from now on) which is mounted on the left front of the vehicle 1 in place of the left-front acceleration sensor 15 to produce a detection signal in response to an impact exceeding a certain level; and 34 designates a mechanical sensor (referred to as "right-front mechanical sensor" from now on) which is mounted on the right front of the vehicle 1 in place of the right-front acceleration sensor 19 to produce a detection signal in response to an impact exceeding a certain level.

Next, the operation of the present embodiment 5 will be described.

Since the basic operation is the same as that of the embodiment 1, only different operation will be mainly described here. A crash of the vehicle 1 has an impact with a magnitude corresponding to its strength on the left-front mechanical sensor 33 and right-front mechanical sensor 34 mounted on the left and right sides in the front of the vehicle 1. When the magnitude of the impact exceeds the certain level, the left-front mechanical sensor 33 and right-front mechanical sensor 34 generate the detection signal at their detecting points. In a frontal crash, the timing difference Tdiff between the detection signals generated by the left-front mechanical sensor 33 and right-front mechanical sensor 34 will be small. In contrast, in an offset crash or oblique crash, the timing difference Tdiff between the detection signals produced by the left-front mechanical sensor 33 and right-front mechanical sensor 34 will be greater than that of the frontal crash. Accordingly, the crash mode such as the asymmetric collision can be identified by detecting the timing difference Tdiff between the signals by the detector 23, and by comparing the timing difference Tdiff with the threshold value Tth by the comparator 24.

Embodiment 6

The foregoing embodiments employ apart from the left-front acceleration sensor 15 and right-front acceleration sensor 19, which are mounted on the left and right sides in the front of the vehicle 1, the internal acceleration sensor 10 mounted on the inside of the vehicle 1. This, however, is not essential. For example, one of the left-front acceleration sensor 15 and the right-front acceleration sensor 19 can share the role of the internal acceleration sensor 10.

Figure 16:
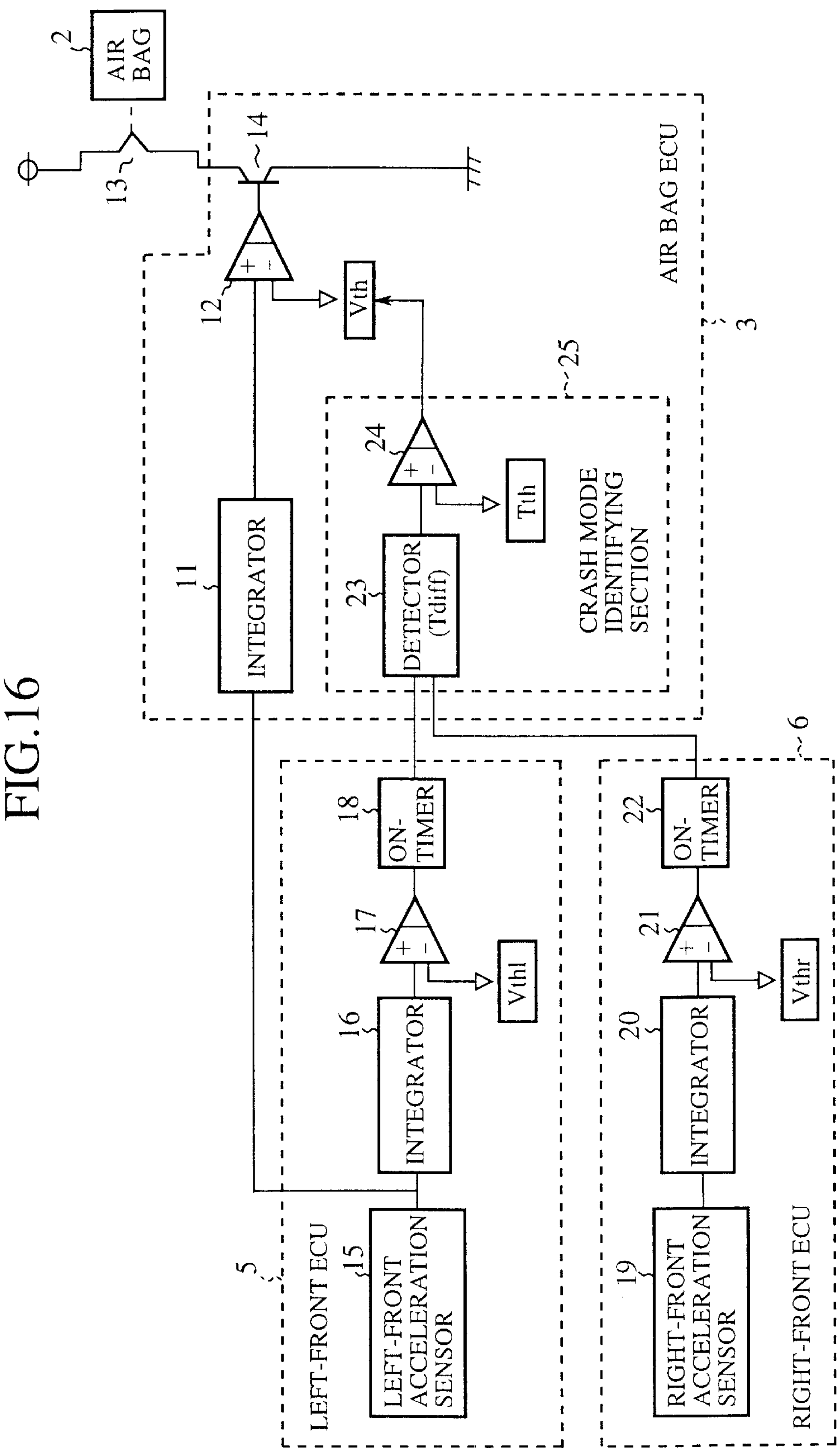
FIG. 16 is a block diagram showing a configuration of an embodiment 6 of the crash detection apparatus of a vehicle in accordance with the present invention.

FIG. 16 is a block diagram showing a configuration of such an embodiment 6 of the crash detection apparatus of a vehicle in accordance with the present invention, in which corresponding portions to those of FIG. 1 are designated by the same reference numerals, and the description thereof is omitted here. In the embodiment as shown in FIG. 16, the acceleration signal output from the left-front acceleration sensor 15 in the left-front ECU 5 is also used as the acceleration signal for the air bag ECU 3 to make the decision of the deployment of the air bag 2. This can achieve cost reduction of the system.

Embodiment 7

The foregoing embodiments employ two collision detectors which are mounted on the left and right sides in the front of the vehicle 1. This, however, is not essential. For example, a single collision detector can be mounted at the center in the front of the vehicle 1.

Figure 17:
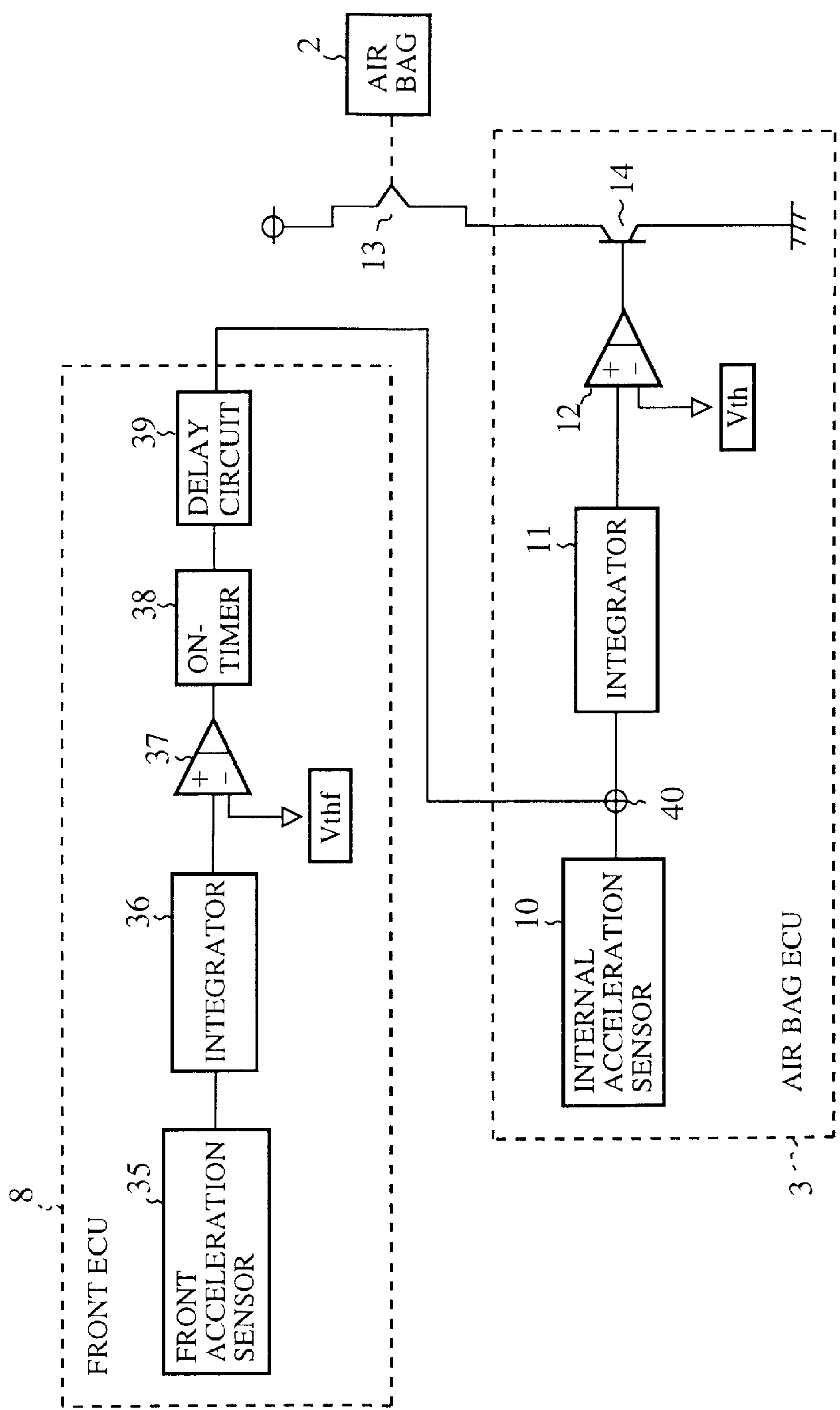
FIG. 17 is a block diagram showing a configuration of an embodiment 7 of the crash detection apparatus of a vehicle in accordance with the present invention.
Figure 18:
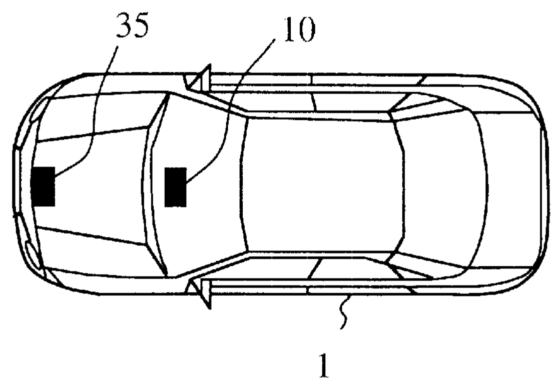
FIG. 18 is a top view showing the placement of acceleration sensors in the embodiment 7.

FIG. 17 is a block diagram showing a configuration of such an embodiment 7 of the crash detection apparatus of a vehicle in accordance with the present invention, and FIG. 18 is a top view illustrating the positions of the acceleration sensors in the crash detection apparatus of a vehicle, in which corresponding components to those of FIGS. 1 and 2 are designated by the same reference numerals, and the description thereof is omitted here.

In FIG. 17, the reference numeral 35 designates an acceleration sensor (referred to as "front acceleration sensor" from now on) which is mounted at the center in the front of the vehicle 1; 36 designates an integrator for integrating the acceleration signal fed from the front acceleration sensor 35; 37 designates a comparator for comparing the integral value from the integrator 36 with a predetermined threshold value Vthf; 38 designates an on-timer for holding, when the comparator 37 turns on because the integral value of the integrator 36 exceeds the threshold value Vthf, the ON signal for a fixed time period Ttimer; and 39 designates a delay circuit for delaying the output signal of the on-timer 38 by a predetermined time Tt. The reference numeral 8 designates a front ECU comprising the front acceleration sensor 35, integrator 36, comparator 37, on-timer 38 and delay circuit 39.

The reference numeral 40 designates a gate circuit placed in the air bag ECU 3 for supplying the integrator 11 with the acceleration signal detected by the internal acceleration sensor 10 only during the ON interval of the signal delayed through the delay circuit 39 in the front ECU 8. The air bag ECU 3 differs from that of the embodiment 1 and so forth in that it comprises the gate circuit 40, but not the crash mode identifying section for changing the threshold value Vth as the crash decision reference level of the comparator 12.

Next, the operation of the present embodiment 7 will be described.

The acceleration signal obtained by the front acceleration sensor 35 in the front ECU 8, which is mounted at the center in the front of the vehicle 1, is input to the integrator 36. The integrator 36 integrates the acceleration signal such that the integral value converges to zero after a fixed time period as in the embodiment 1 by carrying out the reset processing which resets the integral operation at every fixed time period and outputs each time the integral value during the fixed time period, or by carrying out the subtraction processing which subtracts a predetermined value from the integral value at every fixed time period. The integral value output from the integrator 36 is supplied to the comparator 37. The comparator 37 compares the integral value with the predetermined threshold value Vthf, and makes its output signal ON when the integral value exceeds the threshold value Vthf. Receiving the ON signal, the on-timer 38 starts its operation, and holds the ON state for the fixed time period Ttimer. The output signal of the on-timer 38 is delayed through the delay circuit 39 by the predetermined time Tt, and is supplied to the air bag ECU 3.

The internal acceleration sensor 10 in the air bag ECU 3, which is mounted inside the vehicle 1 as illustrated in FIG. 18, detects the acceleration of the vehicle 1, and supplies the detected acceleration signal to the integrator 11 through the gate circuit 40. The gate circuit 40, undergoing the control by the signal fed from the delay circuit 39 in the front ECU 8, supplies the integrator 11 with the acceleration signal from the internal acceleration sensor 10 only during the ON period of the control signal. The integrator 11 integrates the acceleration signal passing through the gate circuit 40, and supplies the integral value to the comparator 12. The comparator 12 compares the integral value with the threshold value Vth, and brings the firing transistor 14 into conduction when the integral value exceeds the threshold value Vth. Thus, the squib 13 is supplied with the start current, and the air bag 2 is deployed.

Figure 19:
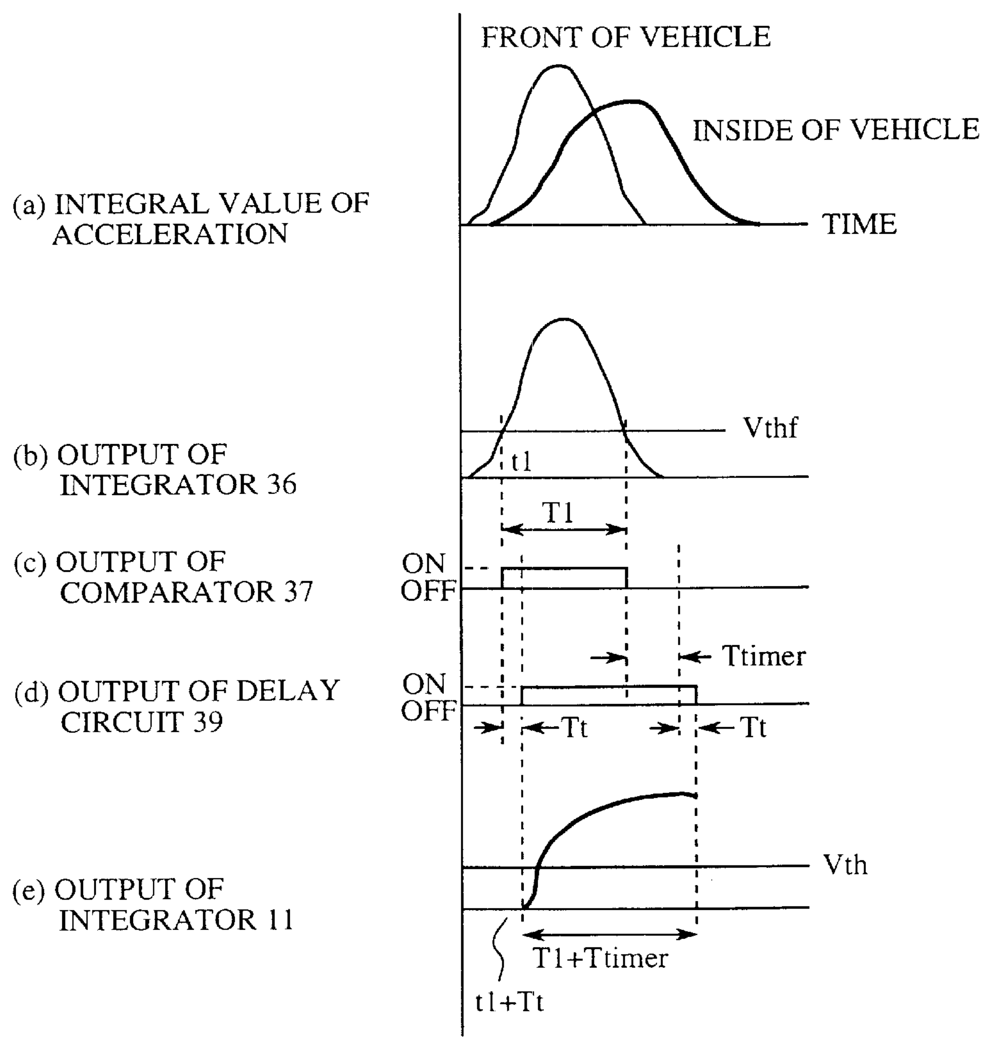
FIG. 19 is a diagram illustrating waveforms of various portions in the embodiment 7 in a frontal crash.

FIG. 19 is a graph illustrating waveforms of various portions in the present embodiment 7 in the event of the frontal crash as shown in FIG. 6A: FIG. 19(*a*) illustrates the integral values of the integrators 11 and 36; FIG. 19(*b*) illustrates the output signal of the integrator 36 depicted in conjunction with the threshold value Vthf; FIG. 19(*c*) illustrates the compared result signal output from the comparator 37; FIG. 19 (*d*) illustrates the decision result signal output from the delay circuit 39; and FIG. 19(*e*) illustrates the waveform of the integral value output from the integrator 11.

In the frontal crash as shown in FIG. 6A, the integral values of the acceleration signals, which are supplied from the front acceleration sensor 35 mounted at the center in the front of the vehicle 1 and from the internal acceleration sensor 10 mounted inside the vehicle 1 as illustrated in FIG. 18, indicate as illustrated in FIG. 19(*a*) that the integral value of the acceleration signal in the front of the vehicle 1 rises earlier and has a greater value than that of the acceleration signal inside the vehicle 1. When the integral value obtained by integrating the acceleration signal obtained by the front acceleration sensor 35 exceeds the threshold value Vthf for a time period T1 from time t1 as illustrated in FIG. 19(*a*), the compared result signal output from the comparator 37 holds the ON state for the time period T1 from the time t1 as illustrated in FIG. 19(*b*). In response to the ON state of the comparator 37, the on-timer 38 holds the ON state for the additional fixed time Ttimer, and the delay circuit 39 delay sit by the predetermined time Tt. Thus, the delay circuit 39 outputs the decision result signal that holds the ON state for the time (T1+Ttimer) from time (t1+Tt) as illustrated in FIG. 19(*d*).

The decision result signal of the front ECU 8 is supplied to the gate circuit 40 in the air bag ECU 3. In the air bag ECU 3, the integrator 11 integrates the acceleration signal detected by the internal acceleration sensor 10, which is supplied to the integrator 11 only while the decision result signal from the front ECU 8 is maintained at the ON state and the gate 40 is open. Since the acceleration signal fed from the internal acceleration sensor 10 is large enough during the integral period, its integral value is also large as illustrated in FIG. 19(*e*). Thus, quick and accurate deployment of the air bag 2 is achieved in response to the crash decision carried out by comparing the integral value with the threshold value Vth used as the crash decision reference level of the comparator 12.

Figure 20:
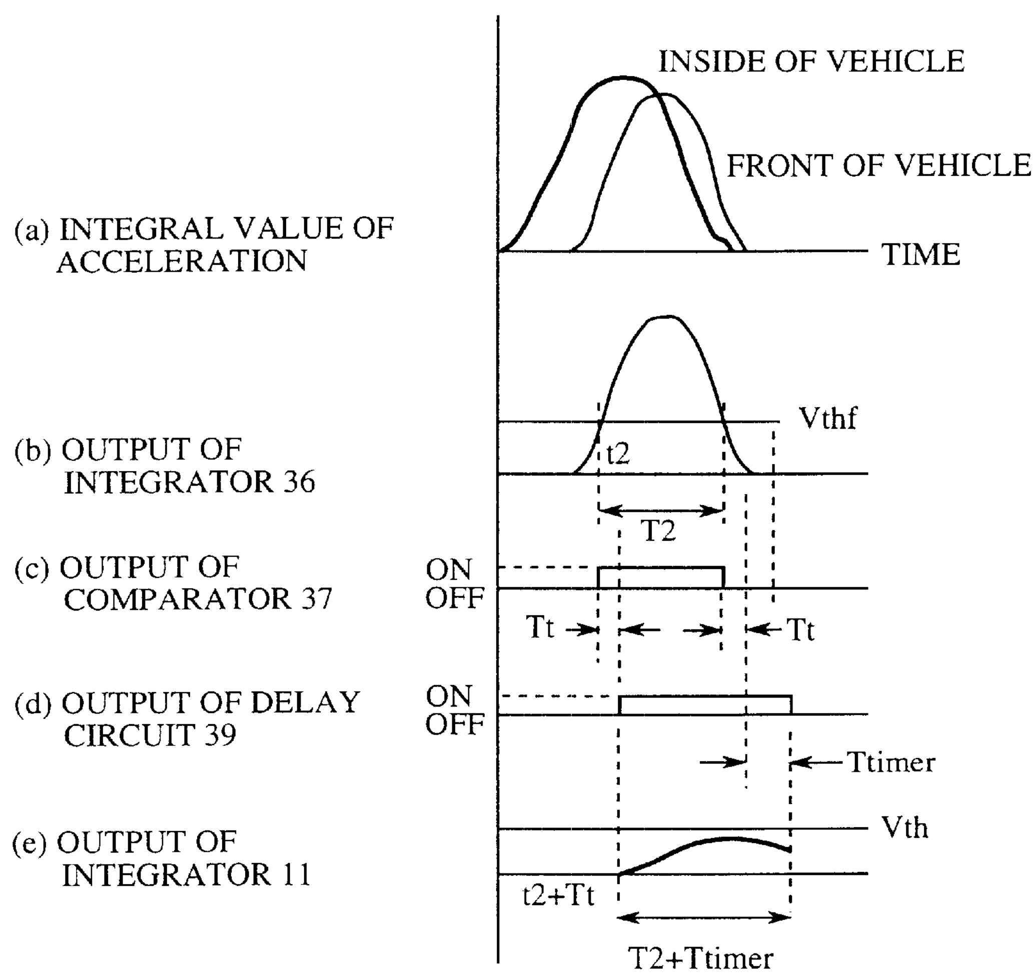
FIG. 20 is a diagram illustrating waveforms of various portions in the embodiment 7 in a rear crash.

FIG. 20 is a graph illustrating waveforms of various portions in the rear crash as shown in FIG. 6D: FIG. 20(*a*) illustrates the integral values of the integrators 11 and 36; FIG. 20(*b*) illustrates the output signal of the integrator 36 depicted in conjunction with the threshold value Vthf; FIG. 20(*c*) illustrates the compared result signal output from the comparator 37; FIG. 20(*d*) illustrates the decision result signal output from the delay circuit 39; and FIG. 20(*e*) illustrates the waveform of the integral value output from the integrator 11.

In the crash mode such as the rear crash as shown in FIG. 6D, in which the vehicle is collided with another vehicle from the behind, and its impact is detected in a direction other than the detection direction of the sensor, the integral values obtained by integrating the acceleration signals, which are supplied from the front acceleration sensor 35 mounted at the center in the front of the vehicle 1 and from the internal acceleration sensor 10 mounted inside the vehicle 1, exhibit as illustrated in FIG. 20(*a*) that the integral value of the acceleration signal inside the vehicle 1 rises earlier and has a greater value than that of the acceleration signal in the front of the vehicle 1. When the integral value obtained by integrating the acceleration signal picked up by the front acceleration sensor 35 exceeds the threshold value Vthf of the comparator 37 for a time period T2 from time t2 as illustrated in FIG. 20(*b*), the comparator 37 outputs the compared result signal as illustrated in FIG. 20(*c*). In response to the ON state of the compared result signal, the on-timer 38 holds the ON state for the additional fixed time Ttimer, and the delay circuit 39 delays it by the predetermined time Tt. Thus, the delay circuit 39 outputs the decision result signal that holds the ON state for a time period (T2 +Ttimer) from time (t2+Tt) to as illustrated in FIG. 20(*d*).

The decision result signal of the front ECU 8 is supplied to the gate circuit 40 in the air bag ECU 3, which enables or disables the acceleration signal detected by the internal acceleration sensor 10 to be supplied to the integrator 11. Since the ON period of the decision result signal of the front ECU 8 is present in the latter half of the crash, the acceleration signal fed from the internal acceleration sensor 10 is small during the integral period. Thus, its integral value is small without exceeding the threshold value Vth used as the crash decision reference level of the comparator 12 as illustrated in FIG. 20(*e*). This makes it possible to distinguish the acceleration in the rear crash from the acceleration in the frontal crash.

Embodiment 8

The foregoing embodiment 7 uses the acceleration signals obtained by the front acceleration sensor 35 and internal acceleration sensor 10 without adding any change to the acceleration signals. This, however, is not essential. For example, the acceleration signals obtained by the front acceleration sensor 35 and internal acceleration sensor 10 can undergo filtering before identifying the crash mode of the vehicle.

Figure 21:
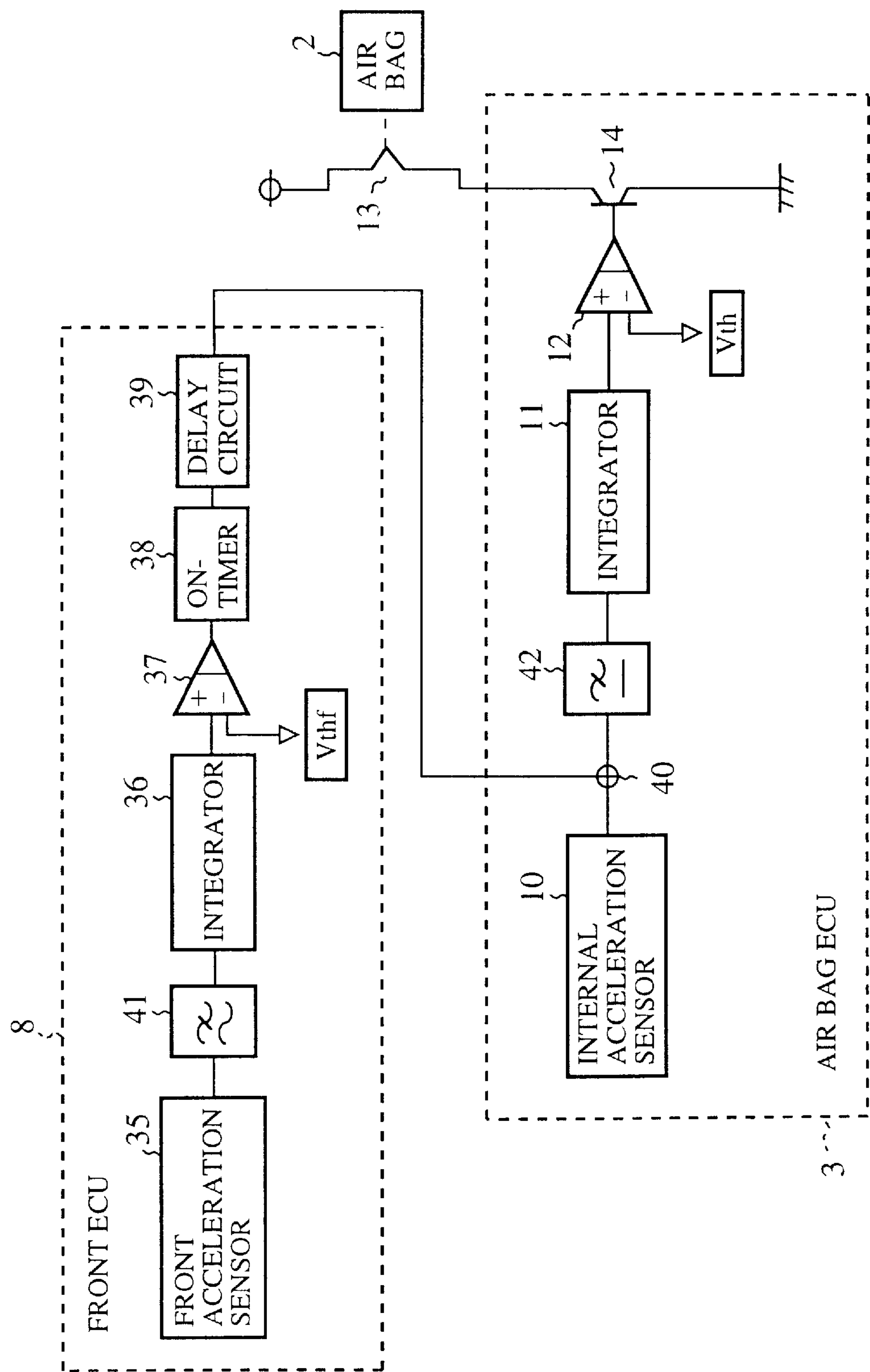
FIG. 21 is a block diagram showing a configuration of an embodiment 8 of the crash detection apparatus of a vehicle in accordance with the present invention.

FIG. 21 is a block diagram showing a configuration of such an embodiment 8 of the crash detection apparatus of a vehicle in accordance with the present invention, in which corresponding portions to those of FIG. 17 are designated by the same reference numerals, and the description thereof is omitted here. In FIG. 21, the reference numeral 41 designates a filter for filtering the acceleration signal obtained by the front acceleration sensor 35; and 42 designates a filter for filtering the acceleration signal obtained by the internal acceleration sensor 10. The outputs of the filters 41 and 42 are supplied to the integrators 36 and 11, respectively.

Next, the operation of the present embodiment 8 will be described.

The acceleration signal obtained by the front acceleration sensor 35 is supplied to the filter 41 to be filtered, and the acceleration signal obtained by the internal acceleration sensor 10 is supplied to the filter 42 to be filtered only while the gate circuit 40 is open. The filters 41 and 42 each consist of a low-pass filter which removes high-frequency components. Since the remaining operation is the same as that of the embodiment 7, the description thereof is omitted here. By thus filtering the acceleration signals fed from the front acceleration sensor 35 and internal acceleration sensor 10 for removing the high-frequency components, abruptly varying components such as noise are eliminated from the signals supplied to the integrators 36 and 11.

Embodiment 9

The foregoing embodiments 7 and 8 employ as a collision detector the front acceleration sensor 35 which is mounted at the center in the front of the vehicle 1. This, however, is not essential. For example, as the collision detector, a mechanical sensor can be used which is mounted at the center in the front of the vehicle 1.

Figure 22:
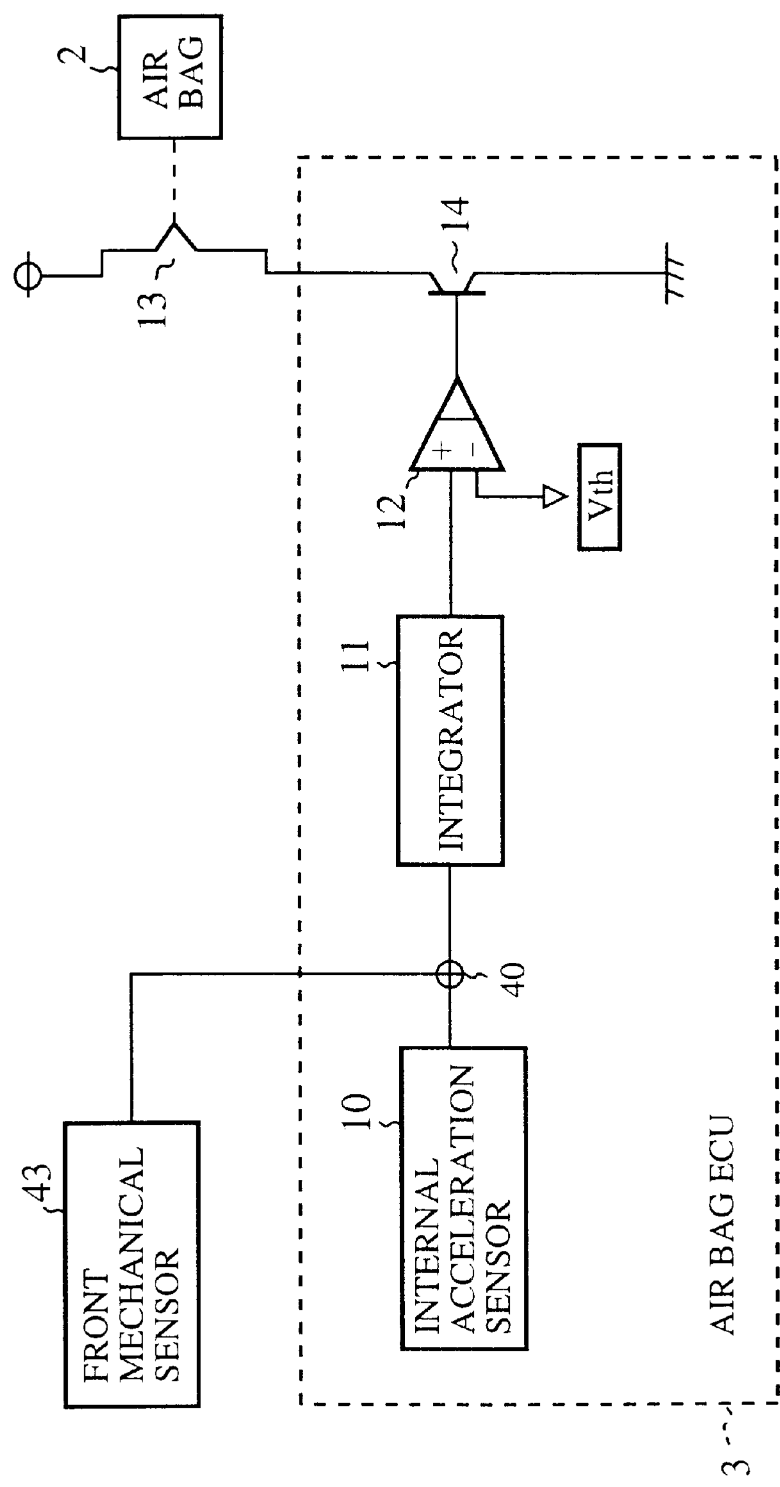
FIG. 22 is a block diagram showing a configuration of an embodiment 9 of the crash detection apparatus of a vehicle in accordance with the present invention.

FIG. 22 is a block diagram showing a configuration of such an embodiment 9 of the crash detection apparatus of a vehicle in accordance with the present invention, in which corresponding portions to those of FIG. 17 are designated by the same reference numerals, and the description thereof is omitted here. In FIG. 22, the reference numeral 43 designates a mechanical sensor (referred to as "front mechanical sensor" from now on) which is mounted at the center in the front of the vehicle 1 in place of the front acceleration sensor 35 to produce a detection signal in response to an impact exceeding a certain level.

Next, the operation of the present embodiment 9 will be described.

Since the basic operation is the same as that of the embodiment 7, only different operation will be mainly described here. A crash of the vehicle 1 has an impact with a magnitude corresponding to its strength on the front mechanical sensor 43 mounted at the center in the front of the vehicle 1. When the magnitude of the impact exceeds the certain level, the front mechanical sensor 43 generates the detection signal at its detecting point. In a frontal crash, the timing the front mechanical sensor 43 generates the detection signal is present in the first half in which the acceleration signal from the internal acceleration sensor 10 is large enough. In contrast, in a rear crash, the timing the front mechanical sensor 43 generates the detection signal is present in the latter half in which the acceleration signal from the internal acceleration sensor 10 becomes small. Accordingly, the crash mode can be identified by comparing the integral value, which is supplied from the integrator 11 that integrates the acceleration signal fed from the internal acceleration sensor 10, with the threshold value Tth by the comparator 24.

What is claimed is:

1. A crash detection apparatus of a vehicle comprising:

a plurality of collision detectors mounted on different positions of a vehicle for detecting a collision of the vehicle; and a crash mode identifying section for identifying a crash mode of the vehicle by comparing detection signals output from said plurality of collision detectors;

wherein the crash mode can be identified as being one of symmetric and asymmetric;

wherein said plurality of collision detectors each consist of an acceleration sensor for detecting an acceleration of the vehicle at a location at which the acceleration sensor is mounted; and wherein said crash mode identifying section identifies the crash mode of the vehicle from a time difference between timings at which integral values obtained by integrating acceleration signals output from the acceleration sensors exceed a preset threshold value.

2. A crash detection apparatus of a vehicle comprising: a plurality of collision detectors mounted on different positions of a vehicle for detecting a collision of the vehicle; and a crash mode identifying section for identifying a crash mode of the vehicle by comparing detection signals output from said plurality of collision detectors;

wherein the crash mode can be identified as being one of symmetric and asymmetric;

wherein said plurality of collision detectors each consist of an acceleration sensor for detecting an acceleration of the vehicle at a location at which the acceleration sensor is mounted; and wherein said crash mode identifying section identifies the crash mode of the vehicle from a time difference between peaks of integral values that are obtained by integrating acceleration signals output from the acceleration sensors.

3. A crash detection apparatus of a vehicle comprising:

a collision detector mounted on a vehicle for detecting a collision of the vehicle;

a first acceleration sensor mounted on the vehicle for detecting an acceleration of the vehicle; and a reference time acquisition section for obtaining from a signal fed from said collision detector a reference time for making a crash mode decision of the vehicle from an acceleration signal output from said first acceleration sensor, the reference time acquisition section comprising:

an on-timer; and a delay circuit;

wherein the crash mode decision can be identified as being one of frontal crash and rear crash.

4. The crash detection apparatus of a vehicle according to claim 3, wherein said collision detector consists of a second acceleration sensor for detecting an acceleration at its mounted position; and said reference time acquisition section determines, as the reference time for making a crash mode decision of the vehicle, a time at which an integral value obtained by integrating an acceleration signal detected by said second acceleration sensor exceeds a predetermined threshold.

5. The crash detection apparatus of a vehicle according to claim 4, further comprising a filter for filtering an acceleration signal output from said second acceleration sensor constituting said collision detector.

6. The crash detection apparatus of a vehicle according to claim 3, wherein said collision detector consists of a mechanical sensor for generating a detection signal in response to an impact exceeding a predetermined level; and said reference time acquisition section determines, as the reference time for making a crash mode decision of the vehicle, a time at which the detection signal is output from the mechanical sensor.

7. The crash detection apparatus of a vehicle according to claim 3, further comprising a crash mode decision section for deciding a crash mode by comparing an integral value with a predetermined threshold value, the integral value being obtained by integrating over a predetermined period from the reference time the acceleration signal output from said first acceleration detector.

8. The crash detection apparatus of a vehicle according to claim 3, wherein said collision detector is mounted at a front of the vehicle, and said first acceleration sensor is mounted behind said collision detector.

* * * * *